(12) United States Patent
Markram et al.

(10) Patent No.: US 11,797,827 B2
(45) Date of Patent: Oct. 24, 2023

(54) INPUT INTO A NEURAL NETWORK

(71) Applicant: INAIT SA, Lausanne (CH)

(72) Inventors: Henry Markram, Pully (CH); Felix Schürmann, Grens (CH); Fabien Jonathan Delalondre, Geneva (CH); Daniel Milan Lütgehetmann, Lausanne (CH); John Rahmon, Lausanne (CH)

(73) Assignee: INAIT SA, Lausanne (CH)

( * ) Notice: Subject to any disclaimer, the term of this patent is extended or adjusted under 35 U.S.C. 154(b) by 668 days.

(21) Appl. No.: 16/710,058

(22) Filed: Dec. 11, 2019

(65) Prior Publication Data

US 2021/0182654 A1    Jun. 17, 2021

(51) Int. Cl.
*G06N 3/047* (2023.01)
*G06F 17/18* (2006.01)
*G06N 3/045* (2023.01)

(52) U.S. Cl.
CPC ............. *G06N 3/047* (2023.01); *G06F 17/18* (2013.01); *G06N 3/045* (2023.01)

(58) Field of Classification Search
CPC .. G06N 3/0472; G06N 3/0454; G06N 3/0445; G06N 3/08; G06N 20/00; G06N 20/20; G06F 17/18
See application file for complete search history.

(56) References Cited

U.S. PATENT DOCUMENTS

| | | | |
|---|---|---|---|
| 5,822,742 A | 10/1998 | Alkon et al. | |
| 7,321,882 B2 | 1/2008 | Herbert | |
| 7,412,426 B2 | 8/2008 | Hercus | |
| 8,818,923 B1 | 8/2014 | Hoffmann | |
| 9,558,442 B2 | 1/2017 | Canoy | |
| 9,785,886 B1 | 10/2017 | Andoni et al. | |
| 9,875,440 B1 | 1/2018 | Lamport | |

(Continued)

FOREIGN PATENT DOCUMENTS

| CN | 104318304 | 1/2015 |
|---|---|---|
| CN | 104335219 | 2/2015 |

(Continued)

OTHER PUBLICATIONS

Liang et al.; "Interpretable Structure-Evolving LSTM"; 2017 IEEE Conference on Computer Vision and Pattern Recognition (CVPR) Year: 2017 | Conference Paper | Publisher: IEEE; Cited by: Papers (42) (Year: 2017).*

(Continued)

*Primary Examiner* — Stacy Whitmore
(74) *Attorney, Agent, or Firm* — Fish & Richardson P.C.

(57) ABSTRACT

Abstracting data that originates from different sensors and transducers using artificial neural networks. A method can include identifying topological patterns of activity in a recurrent artificial neural network and outputting a collection of digits. The topological patterns are responsive to an input, into the recurrent artificial neural network, of first data originating from a first sensor and second data originating from a second sensor. Each topological pattern abstracts a characteristic shared by the first data and the second data. The first and second sensors sense different data. Each digit represents whether one of the topological patterns of activity has been identified in the artificial neural network.

18 Claims, 9 Drawing Sheets

(56) References Cited

U.S. PATENT DOCUMENTS

| | | | |
|---|---|---|---|
| 10,019,506 B1* | 7/2018 | Li | G06V 10/454 |
| 10,417,558 B1 | 9/2019 | Bauer et al. | |
| 10,510,000 B1 | 12/2019 | Lamport | |
| 10,628,486 B2* | 4/2020 | Chu | G06F 16/71 |
| 10,650,047 B2 | 5/2020 | Yanagisawa | |
| 10,885,020 B1* | 1/2021 | Ablitt | G06F 16/2365 |
| 10,922,510 B2 | 2/2021 | Tscherepanow et al. | |
| 11,195,038 B2* | 12/2021 | Nunn | G06V 20/58 |
| 11,218,498 B2* | 1/2022 | Hajimirsadeghi | H04L 63/1425 |
| 11,250,326 B1 | 2/2022 | Ko et al. | |
| 11,278,413 B1* | 3/2022 | Lang | A61F 2/4202 |
| 11,569,978 B2 | 1/2023 | Hess et al. | |
| 11,580,401 B2 | 2/2023 | Markram et al. | |
| 11,615,285 B2 | 3/2023 | Reimann et al. | |
| 11,651,210 B2 | 5/2023 | Henry et al. | |
| 11,652,603 B2 | 5/2023 | Markram et al. | |
| 11,663,478 B2 | 5/2023 | Markram et al. | |
| 2004/0015459 A1 | 1/2004 | Herbert | |
| 2006/0112028 A1 | 5/2006 | Xiao et al. | |
| 2006/0184471 A1* | 8/2006 | Minamino | G10L 15/144 |
| | | | 704/E15.029 |
| 2008/0152217 A1* | 6/2008 | Greer | G06V 10/7715 |
| | | | 375/240 |
| 2009/0006060 A1 | 1/2009 | Rhodes | |
| 2009/0012581 A1 | 1/2009 | Rhodes | |
| 2009/0187736 A1* | 7/2009 | Raichelgauz | G06F 16/43 |
| | | | 712/E9.016 |
| 2014/0156901 A1* | 6/2014 | Raichelgauz | G06F 9/28 |
| | | | 710/305 |
| 2015/0058352 A1 | 2/2015 | Brand | |
| 2015/0206049 A1 | 7/2015 | Canoy et al. | |
| 2015/0280906 A1 | 10/2015 | Shany et al. | |
| 2015/0310303 A1 | 10/2015 | Andreopoulos et al. | |
| 2015/0347870 A1 | 12/2015 | Andreopoulos et al. | |
| 2015/0363689 A1 | 12/2015 | Henry et al. | |
| 2016/0048756 A1 | 2/2016 | Hall et al. | |
| 2016/0350648 A1 | 12/2016 | Gilad-Bachrach et al. | |
| 2017/0124452 A1 | 5/2017 | Tucker et al. | |
| 2017/0139759 A1 | 5/2017 | Bandara | |
| 2017/0213131 A1 | 7/2017 | Hammond et al. | |
| 2017/0229117 A1 | 8/2017 | van der Made et al. | |
| 2017/0249536 A1 | 8/2017 | Hillar et al. | |
| 2018/0018553 A1 | 1/2018 | Bach et al. | |
| 2018/0053108 A1 | 2/2018 | Olabiyi et al. | |
| 2018/0082171 A1 | 3/2018 | Merity et al. | |
| 2018/0136912 A1* | 5/2018 | Venkataramani | G06N 3/04 |
| 2018/0157973 A1 | 6/2018 | El-Yaniv et al. | |
| 2018/0165547 A1 | 6/2018 | Huang et al. | |
| 2018/0197069 A1 | 7/2018 | Reimann et al. | |
| 2018/0197076 A1 | 7/2018 | Paik et al. | |
| 2018/0247198 A1 | 8/2018 | Vasudevan et al. | |
| 2018/0336453 A1 | 11/2018 | Merity et al. | |
| 2018/0373985 A1 | 12/2018 | Yang et al. | |
| 2019/0012574 A1* | 1/2019 | Anthony | B60W 30/00 |
| 2019/0036678 A1 | 1/2019 | Ahmed | |
| 2019/0042988 A1* | 2/2019 | Brown | G06N 5/022 |
| 2019/0050726 A1 | 2/2019 | Azaria et al. | |
| 2019/0122096 A1 | 4/2019 | Husain | |
| 2019/0122140 A1 | 4/2019 | Sen | |
| 2019/0171187 A1* | 6/2019 | Celia | G06N 20/00 |
| 2019/0171929 A1 | 6/2019 | Abadi et al. | |
| 2019/0197410 A1 | 6/2019 | Berry, II | |
| 2019/0228300 A1 | 7/2019 | Cao et al. | |
| 2019/0244348 A1* | 8/2019 | Buckler | G06N 20/00 |
| 2019/0286074 A1 | 9/2019 | Hoffman | |
| 2019/0304568 A1* | 10/2019 | Wei | G06N 20/00 |
| 2019/0312898 A1 | 10/2019 | Verma et al. | |
| 2019/0335192 A1 | 10/2019 | Otto et al. | |
| 2019/0354846 A1 | 11/2019 | Mellempudi et al. | |
| 2019/0370647 A1* | 12/2019 | Doshi | G06F 11/3466 |
| 2019/0377976 A1 | 12/2019 | Markram et al. | |
| 2019/0377999 A1 | 12/2019 | Markram et al. | |
| 2019/0378000 A1 | 12/2019 | Markram et al. | |
| 2019/0378007 A1 | 12/2019 | Markram et al. | |
| 2019/0378008 A1 | 12/2019 | Markram et al. | |
| 2019/0392303 A1 | 12/2019 | Cherubini et al. | |
| 2020/0012927 A1* | 1/2020 | Raichelgauz | G06N 3/063 |
| 2020/0126126 A1* | 4/2020 | Briancon | G06K 9/6297 |
| 2020/0134016 A1* | 4/2020 | Cao | G06N 3/0472 |
| 2020/0184055 A1* | 6/2020 | Storm | G06F 21/32 |
| 2020/0285944 A1* | 9/2020 | Lee | G06N 3/0472 |
| 2020/0302297 A1* | 9/2020 | Jaganathan | G06V 10/7784 |
| 2020/0304284 A1 | 9/2020 | Markram et al. | |
| 2020/0304285 A1 | 9/2020 | Hess et al. | |
| 2020/0310400 A1* | 10/2020 | Jha | G05B 23/0283 |
| 2020/0367810 A1* | 11/2020 | Shouldice | G16H 50/20 |
| 2020/0380335 A1 | 12/2020 | Neznal | |
| 2020/0402497 A1* | 12/2020 | Semenov | G10L 13/10 |
| 2021/0049441 A1* | 2/2021 | Bronstein | G06N 3/0445 |
| 2021/0049446 A1* | 2/2021 | Gurumurthi | G06V 10/82 |
| 2021/0058547 A1 | 2/2021 | Puttamalla et al. | |
| 2021/0097578 A1* | 4/2021 | Holmes | G06Q 10/087 |
| 2021/0110115 A1 | 4/2021 | Hermann et al. | |
| 2021/0182604 A1* | 6/2021 | Anthony | G08G 1/0129 |
| 2021/0182653 A1 | 6/2021 | Markram et al. | |
| 2021/0182655 A1 | 6/2021 | Markram et al. | |
| 2021/0182657 A1 | 6/2021 | Markram et al. | |
| 2021/0182681 A1 | 6/2021 | Markram et al. | |
| 2021/0271319 A1* | 9/2021 | Lussier | A61B 3/113 |
| 2021/0338007 A1* | 11/2021 | Choi | H05B 6/062 |
| 2021/0398621 A1* | 12/2021 | Stojevic | G16C 10/00 |
| 2022/0005332 A1* | 1/2022 | Metzler | G08B 13/1965 |
| 2022/0012877 A1* | 1/2022 | Buckler | G06T 7/0012 |
| 2022/0147760 A1* | 5/2022 | Dutta | G06K 9/6267 |
| 2022/0148454 A1* | 5/2022 | Jaramaz | A61B 5/0077 |
| 2022/0157436 A1* | 5/2022 | Harley | G16H 10/60 |
| 2022/0187847 A1* | 6/2022 | Celia | G05B 19/4155 |
| 2022/0197306 A1* | 6/2022 | Celia | B25J 9/161 |
| 2022/0261593 A1* | 8/2022 | Yu | G06T 7/11 |
| 2022/0269346 A1* | 8/2022 | Hussami | G06F 3/017 |
| 2023/0019839 A1 | 1/2023 | Markram | |
| 2023/0024925 A1 | 1/2023 | Markram et al. | |
| 2023/0028511 A1 | 1/2023 | Markram et al. | |
| 2023/0085384 A1 | 3/2023 | Lütgehetmann et al. | |
| 2023/0171086 A1 | 6/2023 | Hess et al. | |

FOREIGN PATENT DOCUMENTS

| | | | |
|---|---|---|---|
| CN | 107844830 | 3/2018 | |
| CN | 112567387 | 3/2021 | |
| CN | 112567388 | 3/2021 | |
| CN | 112567389 | 3/2021 | |
| CN | 112567390 | 3/2021 | |
| CN | 112585621 | 3/2021 | |
| EP | 1283496 | 2/2003 | |
| EP | 3340121 | 6/2018 | |
| EP | 3803699 | 4/2021 | |
| EP | 3803705 | 4/2021 | |
| EP | 3803706 | 4/2021 | |
| EP | 3803707 | 4/2021 | |
| EP | 3803708 | 4/2021 | |
| KR | 20210008417 | 1/2021 | |
| KR | 20210008418 | 1/2021 | |
| KR | 20210008419 | 1/2021 | |
| KR | 20210008858 | 1/2021 | |
| KR | 20210010894 | 1/2021 | |
| TW | 201437945 | 10/2014 | |
| TW | 201535277 | 9/2015 | |
| TW | 201725519 | 7/2017 | |
| TW | I608429 | 12/2017 | |
| TW | 201928789 | 7/2019 | |
| TW | 201935326 | 9/2019 | |
| TW | 201937392 | 9/2019 | |
| WO | WO-2007137047 A2 * | 11/2007 | G06K 9/6248 |
| WO | WO 2016/206765 | 12/2016 | |
| WO | WO 2017/083399 | 5/2017 | |
| WO | WO 2017/197375 | 11/2017 | |
| WO | WO 2018/175400 | 9/2018 | |
| WO | WO 2019/238483 | 12/2019 | |
| WO | WO 2019/238512 | 12/2019 | |
| WO | WO 2019/238513 | 12/2019 | |
| WO | WO 2019/238522 | 12/2019 | |
| WO | WO 2019/238523 | 12/2019 | |
| WO | WO 2020/187676 | 9/2020 | |

(56) References Cited

FOREIGN PATENT DOCUMENTS

| WO | WO 2020/187694 | 9/2020 |
|---|---|---|
| WO | WO 2021/116071 | 6/2021 |
| WO | WO 2021/116140 | 6/2021 |
| WO | WO 2021/116147 | 6/2021 |
| WO | WO 2021/116250 | 6/2021 |
| WO | WO 2021/116379 | 6/2021 |
| WO | WO 2021/116402 | 6/2021 |
| WO | WO 2021/116404 | 6/2021 |
| WO | WO 2021/116407 | 6/2021 |

OTHER PUBLICATIONS

Gripon et al.; "Sparse Neural Networks with Large Learning Diversity"; IEEE Transactions on Neural Networks; vol. 22, Issue: 7 | Journal Article | Publisher: IEEE; Cited by: Papers (99) | Patents (4) (Year: 2011).*
Yang et al.; "Convolutional Neural Networks with Alternately Updated Clique"; 2018 IEEE/CVF Conference on Computer Vision and Pattern Recognition; Conference Paper | Publisher: IEEE; Cited by: Papers (57) (Year: 2018).*
Bauer et al., "Real-time ultra-low power ECG anomaly detection using an event-driven neuromorphic processor," IEEE transactions on biomedical circuits and systems, Nov. 11, 2019, 13(6):1575-82.
Cai et al., "Path-level network transformation for efficient architecture search," InInternational Conference on Machine Learning, Jul. 3, 2018 PMLR, 10 pages.
Goodman et al., "Brian: a simulator for spiking neural networks in python," Frontiers in neuroinformatics, 2008:5, 10 pages.
International Preliminary Report on Patentability in International Appln. No. PCT/EP2020/085007, dated Jun. 23, 2022, 8 pages.
International Preliminary Report on Patentability in International Appln. No. PCT/EP2020/085016, dated Jun. 23, 2022, 11 pages.
International Preliminary Report on Patentability in International Appln. No. PCT/EP2020/085169, dated Jun. 23, 2022, 8 pages.
International Preliminary Report on Patentability in International Appln. No. PCT/EP2020/085200, dated Jun. 23, 2022, 9 pages.
International Preliminary Report on Patentability in International Appln. No. PCT/EP2020/085434, dated Jun. 23, 2022, 9 pages.
International Preliminary Report on Patentability in International Appln. No. PCT/EP2020/085716, dated Jun. 23, 2022, 11 pages.
International Search Report and Written Opinion in International Appln. No. PCT/EP2020/085716, dated Mar. 25, 2021, 18 pages.
Ludermir et al., "An optimization methodology for neural network weights and architectures," IEEE Transactions on Neural Networks, Nov. 13, 2006, 17(6): 1452-9.
Minkovich et al. "Programming time-multiplexed reconfigurable hardware using a scalable neuromorphic compiler," IEEE transactions on neural networks and learning systems, Apr. 11, 2012, 23(6):889-901.
Rawal et al., "From nodes to networks: Evolving recurrent neural networks," arXiv preprint arXiv:1803.04439, Mar. 12, 2018, 8 pages.
TW Office Action in Taiwanese Appln. No. 108119813, dated Jun. 29, 2020, 17 pages (with machine translation).
Baker et al., "Designing neural network architectures using reinforcement learning," arXiv preprint, arXiv:1611.02167, Nov. 7, 2016, 18 pages.
Blanco et al., "A genetic algorithm to obtain the optimal recurrent neural network," International Journal of Approximate Reasoning, Jan. 2000, 23(1):67-83.
Garcia et al., "Unsupervised classification of neural spikes with a hybrid multilayer artificial neural network," Journal of Neuroscience Methods, 1998, 82:59-73.
International Preliminary Report on Patentability in International Appln. No. PCT/EP2020/056588, dated Sep. 30, 2021, 8 pages.
International Preliminary Report on Patentability in International Appln. No. PCT/EP2020/056686, dated Sep. 30, 2021, 10 pages.

Lee et al., "Detecting highly overlapping community structure by greedy clique expansion," arXiv preprint arXiv:1002.1827, Feb. 9, 2010, 10 pages.
Li et al., "Ternary weight networks," arXiv preprint arXiv:1605.04711, May 16, 2016, 5 pages.
Masulli et al., "The topology of the directed clique complex as a network invariant," SpringerPlus, Dec. 2016, 5(1):1-2.
Sizemore et al., "Cliques and cavities in the human connectome," Journal of computational neuroscience, Feb. 2018, 44(1):115-45.
Guerreiro et al., "A Neural Key Generator for a Public Block Cipher," IEEE Ninth Brazilian Symposium on Neural Networks (SBRN '06), Oct. 23-27, 2006, Ribeirao Preto, BR, 143-147.
PCT international Search Report and Written Opinion in International Appln. No. PCT/EP2020/056588, dated May 26, 2020, 12 pages.
PCT International Search Report and Written Opinion in International Appln. No. PCT/EP2020/056686, dated May 26, 2020, 13 pages.
Andersen et al., "Overlapping clusters for distributed computation," In Proceedings of the Fifth ACM International Conference on Web Search and Data Mining, Feb. 8, 2012, 9 pages.
Baskararaja et al., "Subgraph matching using graph neural network," Journal of Intelligent Learning Systems and Applications, Nov. 28, 2012, 4(04):274-278.
Bauer et al., "Clear and Compress: Computing Persistent Homology in Chunks," Topological Methods in Data Analysis and Visualization III., 2014, pp. 103-117.
Cormen et al., "Introduction to Algorithms," Copyright 2001 by The Massachusetts Institute of Technology, 984 pages.
Erdos and Renyi, "On random graphs, I," Math. Debrecen., 1959, 6:290-297.
Gros, "Cognitive computation with autonomously active neural networks: an emerging field," Cognitive Computation, Mar. 2009, 1(1):77-90.
Gros, "Neural networks with transient state dynamics," New Journal of Physics, Apr. 30, 2007, 9(4): 109, 21 pages.
Gros, "Self-sustained thought processes in a dense associative network," In Annual Conference on Artificial Intelligence, Sep. 11, 2005, Springer, Berlin, Heidelberg, 14 pages.
Hatcher, "Algebraic Topology," Cambridge University Press, Feb. 2002, 556 pages.
Kahle, "Sharp vanishing thresholds for cohomology of random flag complexes," Ann. Of Math., May 2014, 179(3):1085-1107.
Lena et al., "Deep spatio-temporal architectmes and learning for protein structure prediction," Advances in neural information processing systems, 2012, 25, 9 pages.
Lin et al., "Organizing principles of real-time memory encoding: neural clique assemblies and universal neural codes," TRENDS in Neurosciences, Jan. 2006, 29(1):48-57.
Maria, "Algorithms and data structures in computational topology" (Doctoral dissertation, Université Nice Sophia Antipolis), Oct. 28, 2014, 205 pages.
mathworld.wolfram.com [online], "Adjacency Matrix," 2016, retrieved via Internet Archive on Apr. 8, 2022, retrieved from <https://web.archive.org/web/20160311204902/https://mathworld.wolfram.com/AdjacencyMatrix.html>, 2 pages.
Milo et al., "Network Motifs: Simple Building Blocks of Complex Networks," Science, Oct. 25, 2002, 298(5594):824-827.
Park et al., "CNN (Convolutional Neural Network) based in-loop filter in HEVC," In Proceedings of the Korean Society of Broadcast Engineers Conference 2016, The Korean Institute of Broadcast and Media Engineers, 2016, pp. 369-372 (with English Abstract).
Peters et al., "The projection of the lateral geniculate nucleus to area 17 of the rat cerebral cortex. V. Degenerating axon terminals synapsing with Golgi impregnated neurons," J Neurocytol., 1979, 8:331-357.
Srivastava et al., "Dropout: a simple way to prevent neural networks from overfitting," The journal of machine learning research, Jan. 2014, 15(1):1929-58.
TW Office Action in Taiwanese Appln. No. 10943863, dated Mar. 1, 2022, 13 pages (with machine translation).

(56) References Cited

OTHER PUBLICATIONS

Wang et al., "Topological recurrent neural network for diffusion prediction," In2017 IEEE international Conference on Data Mining (ICDM), Nov. 18, 2017, pp. 475-484.
Bahraini et al., "Topological pattern selection in recurrent networks," Neural Networks, Feb. 9, 2012, 31:22-32.
Gros et al., "Semantic learning in autonomously active recurrent neural networks," ARIV.org, Nov. 11, 2018.
PCT International Preliminary Report on Patentability in International Appln. No. PCT/EP2019/064593, dated Dec. 24, 2020, 11 pages.
PCT International Preliminary Report on Patentability in International Appln. No. PCT/EP2019/064740, dated Dec. 24, 2020, 13 pages.
PCT International Preliminary Report on Patentability in International Appln. No. PCT/EP2019/064741, dated Dec. 24, 2020, 9 pages.
PCT International Preliminary Report on Patentability in International Appln. No. PCT/EP2019/064773, dated Dec. 24, 2020, 11 pages.
PCT International Preliminary Report on Patentability in International Appln. No. PCT/EP2019/064776, dated Dec. 24, 2020, 11 pages.
PCT International Search Report and Written Opinion in International Appln. No. PCT/EP2020/085007, dated Mar. 24, 2021, 15 pages.
PCT International Search Report and Written Opinion in International Appln. No. PCT/EP2020/085016, dated Mar. 24, 2021, 18 pages.
PCT International Search Report and Written Opinion in International Appln. No. PCT/EP2020/085169, dated Mar. 18, 2021, 15 pages.
PCT International Search Report and Written Opinion in International Appln. No. PCT/EP2020/085434, dated Mar. 24, 2021, 16 pages.
PCT International Search Report and Written Opinion in International Appln. No. PCT/EP2020/085200, dated Apr. 4, 2021, 15 pages.
Salnikov et al., "Simplicial complexes and complex systems." arxiv.org, Cornell University Library, Jul. 20, 2018, 8 pages.
Yang et al., "Road Detection and Centerline Extraction Via Deep Recurrent Convolutional Neutral Network U-Net," IEEE Transactions on Geoscience and Remote Sensing, Sep. 2019, 57(9):7209-7220.
Abbas et al., "Artificial Intelligence Conquering the next frontier of the digital world," Research Gate, Dec. 17, 2017, 15 pages.
Aharoni et al. "Eigenvalues and homology of flag complexes and vector representations of graphs," Geom. Funct. Anal., Jul. 28, 2005, 15:555-566.
Alaniz, "Machiavellian Playbook for Artificial General Intelligence (AGI), Early Doctrine for AGI power," Research Gate, Aug. 2018, pp. 1-42.
Alaniz, "Remaking Einstein with a Dynamical Graph Rich Person Object Avatar Extraction Markup Language (intelligence as topological algebraic invariants, graph entropies, and dynamics)," Mar. 16, 2019, 14 pages.
Allswede et al., "Prenatal inflammation and risk for schizophrenia: A role for immune proteins in neurodevelopment," Development and Psychopathology, Aug. 2, 2018, 30: 1157-1178.
Angeli, "Symmetric functions for fast image retrieval with persistent homology," Math Meth Appl Sci., Apr. 24, 2018, 41:9567-9577.
Antonopoulos et al., "Evaluating performance of neural codes in neural communication networks," Neural Networks, Sep. 24, 2018, pp. 1-17.
Bale et al., "Efficient population coding of naturalistic whisker motion in the ventro-posterior medial thalamus based on precise spike timing," Front. Neural Circuits, Sep. 25, 2015, 9: 1-14.
Baptiste-Bardin et al., "Topological exploration of artificial neuronal network dynamics," Network Neuroscience, Jan. 24, 2019, pp. 1-28.

Basset et al., "Network models in neuroscience," arXiv, Jul. 21, 2018, pp. 1-12.
Basset et al., "On the nature and use of models in network neuroscience," Nature Reviews, Jul. 12, 2018, 19:566-578.
Bassett et al., "Network Neuroscience," Network Neuroscience, Nat. Neurosci., Mar. 20, 2017, 20:353-364.
Baudot et al., "Topological Information Data Analysis," Entropy, Sep. 2019, 21:1-38.
Bauer et al., "PHAT—Persistent Homology Algorithms Toolbox," J. Symb. Comput., Jan. 1, 2017, 78: 76-90.
Bergomi et al., "Topological Graph persistence," Mathematics, Jul. 20, 2017, pp. 1-15.
Betzel, "Stability of spontaneous, correlated activity in mouse auditory cortex," PLOS: Computational Biology, Dec. 9, 2019, 1-25.
Bianconi et al., "Topological percolation on hyperbolic simplicial complexes," Phys. Rev. E, Nov. 21, 2018, 5:1-18.
Bienenstock et al., "A model of neocortex," Network Comput. Neural Syst., Jul. 27, 1994, 6:179-224.
Brody et al., "Correlations without synchrony," Neural Comput. 11, Oct. 1, 1999, 11:1537-1551.
Bullmore et al., "Complex brain networks: graph theoretical analysis of structural and functional systems," Nat. Rev. Neurosci., Mar. 10, 2009, 10:186-198.
Busch et al., "Intrinsic temporal tuning of neurons in the optic tectum is shaped by multisensory experience," Journal of Neurophysiology, Sep. 5, 2019, pp. 1-23.
Chacholski et al., "On the topology of complexes of injective words," Journal of Applied and Computational Topology, Aug. 16, 2019, 21:1-16.
Chambers et al., "Higher-order synaptic interactions coordinate dynamics in recurrent networks," Plos Computational Biology, Aug. 19, 2016, 23 pages.
Chella et al., "Representational Issues in the Debate on the Standard Model of the Mind," Association for the Advancement of Artificial Intelligence, Nov. 12, 2017, pp. 1-6.
Chklovskii et al., "Cortical rewiring and information storage," Nature, Oct. 14, 2004, 431:782-788.
Choi et al., "A Survey of Binary Similarity and distance measures," Systemic, Cybernetics, and Informatics, Jan. 8, 2010, 8:43-48.
Choudhary, "Approximation algorithms for Vietoris-Rips and Čech filtrations," Doctoral Thesis of Computer Science, Faculty of Mathematics and Computer Science, Heidelberg University, Dec. 14, 2017, 140 pages.
Chowdhury et al., "Path homologies of deep feedforward networks," Arxiv, Oct. 16, 2019, pp. 1-6.
Coggan et al., "A Process for Digitizing and Simulating Biologically Realistic Oligocellular Networks Demonstrated for the Neuro-Glio-Vascular Ensemble," Neurosci, Sep. 25, 2018, 12:1-21.
Collins, "The case for emulating insect brains using anatomical "wiring diagrams" equipped with biophysical models of neuronal activity," Biological cybernetics, Dec. 1, 2019, 113: 465-75.
Courtney et al., "Dense Power-law Networks and Simplicial Complexes," ArXiv, Apr. 23, 2018, pp. 1-16.
Crawford et al., "A theory on the role of π-electrons of docosahexaenoic acid in brain function: The six methylene-interrupted double bonds and the precision of neural signaling," Oilseeds & fats Crops and Lipids, May 21, 2018, pp. 1-14.
Curto, "Relating network connectivity to dynamics: opportunities and challenges for theoretical neuroscience," Current Opinion in Neurobiology, Oct. 1, 2019, 58:11-20.
Davydov et al., "Neural Network Structures: Current and Future States," Research Gate, Feb. 2, 2018, pp. 1-6.
Dlotko et al., "Topological analysis of the connectome of digital reconstructions of neural microcircuits," ArXiv, a working paper, Jan. 7, 2016, 1-28 pages.
Doborjeh et al., "Spiking Neural Network Modelling Approach Reveals How Mindfulness Training Rewires the Brain," Scientific Reports, Apr. 23, 2019, 9:1-15.
Ebli, "A Notion of Harmonic Clustering in Simplicial Complexes," Laboratory for Topology and Neuroscience, École Polytechnique Fédérale de Lausanne, 1015 Lausanne, Switzerland, Oct. 17, 2019, 9 pages.

(56) References Cited

OTHER PUBLICATIONS

Engel et al., "Temporal binding and the neural correlates of sensory awareness," Trends Cogn. Sci., Jan. 1, 2001, 5: 16-25.
EP Extended European Search Report in EP Appln. No. 17174314.9, dated Dec. 14, 2017, 11 pages.
Erdős et al., "On the evolution of random graphs," Publ. Math. Inst. Hung. Acad. Sci., Jan. 1960, 17-60.
Fan et al., "A Brief History of Simulation Neuroscience," Front. Neuroinform., May 7, 2019, 13:1-28.
Feldbrugge et al., "Stochastic homology of Gaussian vs. non-Gaussian random fields: graphs towards Betti numbers and persistence diagrams," Journal of Cosmology and Astroparticle Physics, Sep. 24, 2019, 49 pages.
Feng et al., "Persistent Homology of Geospatial Data: A Case Study with Voting," Jan. 30, 2019, pp. 1-29.
Garcia et al., "Reconfigurations within resonating communities of brain regions following TMS reveal different scales of processing," BioRxiv, Jan. 9, 2020, pp. 1-39.
Github.com [online] "pytorch-tutorial/tutorials/03-advanced/image_captioning/," Oct. 2007, retrieved on Jan. 21, 2020, retrieved from UR: <https://github.com/yunjey/pytorch-tutorial/tree/master/tutorials/03-advanced/image_captioning>, 3 pages.
Giusti et al., "Two's company, three (or more) is a simplex," Journal of Computational Neuroscience, Jun. 11, 2016, 14 pages.
Giusti et al., "Clique topology reveals intrinsic geometric structure in neural correlations," Proc. Natl. Acad. Sci. U.S.A., Apr. 28, 2015, 112:13455-13460.
Gong, "Evolution to a small-world network with chaotic units," Europhysics Letters (EPL), Jul. 15, 2004, 67:328-333.
Graves et al., "Adaptive computation time for recurrent neural networks," CORR (ARXIV) Feb. 21, 2017, 19 pages.
Guerreno, "The sleep onset transition: a connectivity investigation built on EEG source localization," University of Zurich, Facult of Science, Aug. 6, 2018, pp. 1-292.
Harris et al. "The neocortical circuit: themes and variations," Nat. Neurosci., Jan. 27, 2015, 18:170-181.
Hastings et al., "Challenges in the analysis of complex systems: introduction and overview," The European Physical Journal Special Topics, Dec. 28, 2017, 226:3185-3197.
Haun et al., "Conscious Perception as Integrated Information Patterns in Human Electrocorticography," eNeuro: Cognition and Behavior, Sep. 19, 2017, 4:2-18.
Hebb, "The Organization of Behavior: A Neuropsychological Theory," New York, NY: Wiley & Sons, 1949, pp. 1-365.
Hoan Tran et al., "Scale-variant topological information for characterizing the structure of complex networks," Physical Review E. Sep. 18, 2019, 100:1-18.
Holtmaat et al., "Experience-dependent structural synaptic plasticity in the mammalian brain," Nat. Rev. Neurosci., Sep. 10, 2009, 10: 647-658.
Hu et al., "Local paths to global coherence: cutting networks down to size," Phys. Rev. E, Mar. 10, 2014, 89: 1-16.
Ibanze-Marcelo et al., "Topology highlights mesoscopic functional equivalence between imagery and perception: The case of hypnotizability," NeuroImage, Jun. 19, 2019, 437-449.
Ignacio et al., "Classification of Single-lead Electrocardiograms: TDA Informed Machine Learning," ArXiv, Nov. 25, 2019, pp. 1-6.
Ignacio et al., "Tracing patterns and shapes in remittance and migration networks via persistent homology," EPJ Data Science, Jan. 5, 2019, 8:1-25.
Ivancevic et al., "Tensor-Centric Warfare II: Entropic Uncertainty Modeling," Intelligent Control and Automation, May 30, 2018, 9:30-51.
Ivancevic et al., "Tensor-Centric Warfare V: Topology of Systems Confrontation," Intelligent Control Automation, Feb. 28, 2019, 10:13-45.
Judge, "Prefix "Re-Cognition" as prelude to fixing sustainability—"pro" vs. "con"? Speculative review of missing emphasis potentially vital for psychosocial balance," Research Gate, Jul. 16, 2017, pp. 1-22.
Kanari et al., "A Topological Representation of Branching Neuronal Morphologies," Neuroinformatics, Oct. 3, 2017, 11 pages.
Kanari et al., "Quantifying topological invariants of neuronal morphologies," ArXiv, Mar. 28, 2016, 15 pages.
Kartun-Giles, "Beyond the clustering coefficient: A topological analysis of node neighborhoods in complex networks," Chaos, Solitons & Fractals: X, Feb. 16, 2019, 1:1-12.
Kastanenka et al., "A roadmap to integrate astrocytes into Systems Neuroscience," Gila, Wiley Periodicals, Apr. 9, 2019, pp. 1-22.
Khajezade et al., "A Game-Theoretical Network Formation Model for C. elegans Neural Network," Frontiers in Computational Neuroscience, Jul. 9, 2019, 13:1-12.
Knoblauch et al., "Memory capacities for synaptic and structural plasticity," Neural Comput., Feb. 2010, 22:289-341.
Kulakov, "Features of a Simple Psychophysiological Reaction," Human Physiology, Jun. 15, 2017, 44:412-417.
Kumarashinghe, "Deep learning and deep knowledge representation in Spiking Neural Networks for Brain-Computer Interface, "Neural Networks, Sep. 20, 2019, 121:169-185.
Kumbhar et al., "CoreNeuron: An Optimized Compute Engine for the NEURON Simulator," Frontiers in Neuroinformatics, Sep. 4, 2019, pp. 1-27.
Kvam, "A geometric framework for modeling dynamic decisions among arbitrarily many alternatives," Journal of Mathematical Psychology, Aug. 1, 2019, 91:14-37.
Latora et al., "Efficient behavior of small-world networks," Phys. Rev. Lett, Oct. 17, 2001, 87:1-4.
Le Be et al., "Spontaneous and evoked synaptic rewiring in the neonatal neocortex," Proc. Natl. Acad. Sci. U.S.A., Aug. 29, 2006 103:13214-13219.
Levi, "A short course on Algebraic topology geared towards applications to Neuroscience," University of Aberdeen, Jul. 18, 2017, pp. 1-14.
Luccioli et al., "Modeling driver cells in developing neural networks," PLOS Computational Biology, Nov. 2, 2018, pp. 1-31.
Luczak et al., "Packetbased communication in the cortex," Nat. Rev. Neurosci., Oct. 28, 2015, 16:745-755.
Lutgehetmann et al., "Computing Persistent Homology of Directed Flag Complexes," Algorithms, Jan. 7, 2020, 1:1-18.
Lynn et al., "The physics of brain network structure, function, and control," Nature Reviews, May 27, 2019, 1:318-322.
Mardones, "Persistence Steenrod modules," ArXiv Mathematics, Dec. 12, 2018, pp. 1-10.
Markram et al., "Reconstruction and simulation of neocortical microcircuitry," Cell, Oct. 8, 2015, 163:456-492.
Masulli et al., "Dynamics of evolving feed-forward neural networks and their topological invariants," Network and Parallel Computing, Aug. 13, 2016, pp. 99-106.
McCoss, Agency of Life, Entropic Gravity and Phenomena Attrivuted to "Dark Matter," Journal of Quantum Information Science, Jun. 15, 2017, 7:67-75.
McCoss, "Lithium Quantum Consciousness," Journal of Quantum Information Science, Nov. 8, 2017, 7:125-139.
Mehta, "Storing and retrieving long-term memories: cooperation and competition in synaptic dynamics," Advances in Physics: X, Jul. 19, 2018, 3:756-790.
Meyer et al., "Cell type-specific thalamic innervation in a column of rat vibrissal cortex," Cereb. Cortex, Jun. 9, 2010, 20: 2287-2303.
Millán et al., "Complex Network Geometry and Frustrated Synchronization," Scientific Reports, Jul. 2, 2018, 8:1-10.
Millan Vidal et al., "Synchronization in network geometries with finite spectral dimension," ArXiv, Jan. 31, 2019, pp. 1-15.
Miller et al., "Visual stimuli recruit intrinsically generated cortical ensembles," Proc. Natl. Acad. Sci. U.S.A., Sep. 8, 2014, pp. E4053-E4061.
Miura et al., "Sparse Parallel Algorithms for Recognizing Touch Topology on Curved Interactive Screens," IEEE Access, Jul. 31, 2017, 5:14889-14897.
Muller et al., "Neocortical plasticity: an unsupervised cake but no free lunch," 33rd Conference on Neural Information Processing Systems, Vancouver, Canada, Nov. 2019, 6 pages.

(56) References Cited

OTHER PUBLICATIONS

Munkres, "Elements of Algebraic Topology," Massachusetts Institute of Technology, 1984, Addison-Wesley Publishing Company, 233 pages.
Nolte, "Cortical reliability amid noise and chaos," Nature Communications, Aug. 22, 2019, 10:1-15.
Norton, "Dynamics of Reaction-Diffusion Oscillators in Star and other Networks with Cyclic Symmetries Exhibiting Multiple Clusters," Physical Review Letters, Oct. 4, 2019, 123: 1-6.
Opris et al., "What Is the Evidence for Inter-laminar Integration in a Prefrontal Cortical Minicolumn?," Frontiers in Neuroanatomy, Dec. 14, 2017, 11: 1-11.
Pajevic et al., "The organization of strong links in complex networks," Nat. Phys., Mar. 11, 2012, 8:429-436.
Palm et al., "On the significance of correlations among neuronal spike trains," Biol. Cybern., Jun. 1, 1988, 59:1-11.
Patel et al., "Generative Design of Electromagnetic Structures Through Bayesian Learning," IEEE Transactions on Magnetics, Oct. 20, 2017, 54:1-4.
Paugam-Moisy et al., "Delay learning and polychronization for reservoir computing," Neurocomputing, Feb. 1, 2008, 71:1143-1158.
PCT International Search Report and Written Opinion in International Appln. No. PCT/EP2019/064593, dated Sep. 6, 2019, 18 pages.
PCT International Search Report and Written Opinion in International Appln. No. PCT/EP2019/064740, dated Sep. 6, 2019, 18 pages.
PCT International Search Report and Written Opinion in International Appln. No. PCT/EP2019/064741, dated Sep. 6, 2019, 16 pages.
PCT International Search Report and Written Opinion in International Appln. No. PCT/EP2019/064773, dated Sep. 6, 2019, 17 pages.
PCT International Search Report and Written Opinion in International Appln. No. PCT/EP2019/064776, dated Sep. 6, 2019, 17 pages.
Pedregosa et al., "Scikit-learn: machine learning in Python," J. Mach. Learn. Res., Oct. 2010, 12:2825-2830.
Peng, "High-throughput microcircuit analysis of individual human brains through next-generation multineuron patch-clamp," BioRxiv, Jan. 1, 2019, pp. 1-49.
Perin et al., "A synaptic organizing principle for cortical neuronal groups," Proc. Natl. Acad. Sci. U.S.A., Mar. 29, 2011, 108:5419-5424.
Peters et al., "The projection of the lateral geniculate nucleus to area 17 of the rat cerebral cortex. I General description.," J. Neurocytol., Feb. 1976, 5:63-84.
Petlevski, "Modeling the Model: the World Beyond the Immediate Sensorium," Proceedings of the 20th International Multiconference Information Society, Oct. 18, 2017, pp. 44-47.
Petri et al., "Homological scaffolds of brain functional networks," J. R. Soc. Interface, Dec. 6, 2014, 1:1-11.
Petri et al., "Simplicial Activity Driven Model," Phys. Rev. Lett., Nov. 29, 2018, 121:1-5.
Planas et al., "Accelerating Data Analysis in Simulation Neuroscience with Big Data Technologies," International Conference on Computational Science, Jun. 1, 2018, pp. 363-377.
Popa, "Psychology 2.0: The Emergence of Individuality," Sep. 2019, pp. 1-6.
Prentner, "Consciousness and Topologically Structured Phenomenal Spaces," Consciousness and Cognition, Feb. 26, 2019, 70:25-38.
Ramaswamy et al., "The neocortical microcircuit collaboration portal: a resource for rat somatosensory cortex," Front. Neural Circuits, Oct. 8, 2015, 9:1-14.
Reimann et al., "Cliques of Neurons Bound into Cavities Provide a Missing Link between Structure and Function," Frontiers in Computational Neuroscience, Jun. 12, 2017, 11:1-16.

Reimann et al. "An algorithm to predict the connectome of neural microcircuits," Front. Comput. Neurosci., Oct. 8, 2015, 9:1-18.
Renart et al., "The asynchronous state in cortical circuits," Science 327, Jan. 29, 2010, 587-590.
Rosenbaum et al., "The spatial structure of correlated neuronal variability," Nat. Neurosci., Oct. 21, 2016, 20:107-114.
Santos et al., "Topological phase transitions in functional brain networks," Physical Review E, Sep. 30, 2019, 100: 1-17.
Saucan et al., "Forman's Ricci Curvature—From Networks to Hypemetworks," vol. 1, Proceedings The 7th International Conference on Complex Networks and Their Applications, ArXiv, Oct. 17, 2018, 13 pages.
Schoenberg et al., "Mapping Meditative States and Stages with Electrophysiology: Concepts, Classifications, and Methods," Current Opinion in Psychology, Oct. 18, 2018, 28:211-217.
SciPy.org [online]," SciPy: Open Source Scientific Tools for Python," available on or before Mar. 9, 2001, via Internet Achieve: Wayback Machine URL <https://web.archive.org/web/20010309040805/http://www.scipy.org/>, retrieved on Jan. 17, 2020, <https://www.scipy.org/citing.html>.
See et al.,"Coordinated neuronal ensembles in primary auditory cortical columns," Elife Sciences, Jun. 5, 2018, pp. 1-33.
Shepherd et al., "Geometric and functional organization of cortical circuits," Nat. Neurosci., May 8, 2005, 8:782-790.
Sizemore et al., "The importance of the whole: Topological data analysis for the network neuroscientist," Network Neuroscience, Oct. 17, 2018 3:1-18.
Skardal et al., "Abrupt Desynchronization and Extensive Multistability in Globally Coupled Oscillator Simplexes," Physical Review Letters 122, Jun. 19, 2019, pp. 1-6.
Song et al. "Highly nonrandom features Of synaptic connectivity in local cortical circuits," PLoS Biol., Mar. 1, 2005, 3:0507-0519.
Stepanyants et al., "Neurogeometry and potential synaptic connectivity," Trends in Neurosci., Jun. 2, 2005, 28:387-394.
Suarez, "The interaction between task goals and the representation of choice options in decisionmaking," Thesis for the degree of Doctor of Philosophy, University College of London, Sep. 2017, pp. 1-176.
Sun et al., "Runtime detection of activated poly chromous neuronal group towards its spatiotemporal analysis," 2015 International Joint Conference on Neural Networks, Jul. 12-17, 2015, 1-8.
Timsit et al., "Nervous-Like Circuits in the Ribosome Facts, Hypotheses and Perspectives," Int. J. Mol. Sci, Jun. 14, 2019, 20:1-22.
Tozzi et al., "Brain Projective Reality: Novel Clothes for the Emperor, Reply to comments of "Topodynamics of metastable brains," by Tozzi et al." Physics of Life Reviews, Jun. 28, 2017, pp. 1-11.
Turner, "Rips filtrations for quasimetric spaces and asymmetric functions with stability results," Algebraic & Geometric Topology, May 21, 2019, 19:1135-1170.
Tyukin et al., "High-Dimensional Brain: A Tool for Encoding and Rapid Learning of Memories by Single Neurons," Bull Math Biol., Mar. 19, 2018, 11:4856-4888.
Varshney et al., "Structural properties of the caenorhabditis elegans neuronal network," PLoS Comput. Biol., Feb. 3, 2011, 7:1-22.
Velazquez et al., "On a Simple General Principle of Brain Organization," Frontiers in Neuroscience, Oct. 15, 2019, 13:1-16.
Wijaya et al., "Finding an appropriate equation to measure similarity between binary vectors: case studies on Indonesian and Japanese herbal medicines," BMC bioinformatics, Dec. 2016,17:1-19.
Willshaw et al., "Nonholographic associative memory," Nature 222, Jun. 7, 1969, pp. 960-963.
Woodward et al., "A Reservoir Computing approach to Image Classification using Coupled Echo State and Back-Propagation Neural Networks," International conference image and vision computing, Auckland, New Zealand, Nov. 29, 2011, 6 pages.
Young, "Standard Laterality Models: Neo-Eriksonian Perspectives," Chapters, Causality and Development, Jan. 2019, pp. 147-179.
Curto et al., "Cell groups reveal structure of stimulus space," Plos Comput. Biol., Oct. 2008, 4(10):e100205.
Curto, "What Can Topology Tell Us About the Neural Code?," The American Mathematical Society, Jan. 2017, 54(1):63-78.

(56) References Cited

OTHER PUBLICATIONS

Dabaghian et al., "A topological paradigm for hippocampal spatial map formation using persistent homology," Plos Comput. Biol., Aug. 2012, 8(8):e1002581.

Dabaghian et al., "Reconceiving the hippocampal map as a topological template," Elife, Aug. 20, 2014, 3:e03476.

DeCharms et al., "Primary cortical representation of sounds by the coordination of action-potential timing," Nature, Jun. 13, 1996, 381(6583):610-613.

Jozefowicz et al., "An Empirical Exploration of Recurrent Network Architectures," Proceedings of the 32nd International Conference on Machine Learning, 2015, 37:1-9.

Office Action in U.S. Appl. No. 16/004,671, dated Oct. 27, 2022, 40 pages.

Office Action in U.S. Appl. No. 16/710,2056, dated Oct. 26, 2022, 51 pages.

Office Action in U.S. Appl. No. 16/004,635, dated Jan. 23, 2023, 24 pages.

Djurfeldt et al., "Efficient generation of connectivity in neuronal networks from simulator-independent descriptions," Frontiers in Neuroinformatics, Mar. 28, 2014, 8(43):1-11.

Dlotko [online], "Directed clique topology," (slides are titled "Directed Complexes"), presented at BIRS workshop, video from 17w5043: Topological Methods in Brain Network Analysis, May 11, 2017, retrieved from < http://www.birs.ca/events/2017/5-day-workshops/17w5043/videos/watch/201705111127-Dlotko.html>, retrieved on Jul. 26, 2022, 26 pages.

docs.opencv.org [online], "Camera Calibration and 3D Reconstruction," Apr. 14, 2020, retrieved on Oct. 5, 2022, retrieved from URL <https://docs.opencv.org/4.4.0/d9/d0c/group_calib3d.html#ga549c2075fac14829ff4a58bc931c033d)> , 78 pages.

docs.opencv.org [online], "Pose Estimation," available no later than Sep. 13, 2021, retrieved on Oct. 5, 2022, retrieved from URL <https://docs.opencv.org/4.x/d7/d53/tutorial_py_pose.html>, 3 pages.

Extended European Search Report in European Appln. No. 17174316.4, dated Dec. 14, 2017, 11 pages.

Extended European Search Report in European Appln. No. 17174317.2, dated Dec. 14, 2017, 11 pages.

Github.com [online], "facebookresearch/detectron2," 2019, retrieved on Oct. 5, 2022, retrieved from URL <https://github.com/facebookresearch/detectron2>, 4 pages.

Gleeson et al., "Open Source Brain: A Collaborative Resource for Visualizing, Analyzing, Simulating, and Developing Standardized Models of Neurons and Circuits," Neuron, Aug. 7, 2019, 103(3):395-411.e5.

International Preliminary Report on Patentability in International Appln. No. PCT/EP2020/085750, dated Jun. 23, 2022, 8 pages.

International Preliminary Report on Patentability in International Appln. No. PCT/EP2020/085754, dated Jun. 23, 2022, 12 pages.

International Preliminary Report on Patentability in International Appln. No. PCT/EP2020/085762, dated Jun. 23, 2022, 7 pages.

International Search Report and Written Opinion in International Appln. No. PCT/EP2020/085750, dated Apr. 6, 2021, 10 pages.

International Search Report and Written Opinion in International Appln. No. PCT/EP2020/085754, dated Apr. 6, 2021, 14 pages.

International Search Report and Written Opinion in International Appln. No. PCT/EP2020/085762, dated Apr. 6, 2021, 9 pages.

Office Action in Korean Appln. No. 2020/7035845, dated Feb. 16, 2022, 9 pages (with English translation).

Office Action in Korean Appln. No. 2020-7035843, dated Jan. 27, 2022, 9 pages (with English translation).

Office Action in Korean Appln. No. 2020-7035844, dated Feb. 17, 2022, 6 pages (with English translation).

Office Action in Korean Appln. No. 2020-7035846, dated Feb. 15, 2022, 6 pages (with English translation).

Office Action in Korean Appln. No. 2020-7035847, dated Aug. 10, 2022, 5 pages (with English translation).

Office Action in Korean Appln. No. 2020-7035847, dated Feb. 15, 2022, 11 pages (with English translation).

Office Action in Taiwanese Appln. No. 108119813, dated May 19, 2021, 8 pages (with machine translation).

Office Action in Taiwanese Appln. No. 109143238, dated Dec. 1, 2021, 18 pages (with machine translation).

Office Action in Taiwanese Appln. No. 109143239, dated Nov. 30, 2021, 22 pages (with machine translation).

Office Action in Taiwanese Appln. No. 109143240, dated Dec. 24, 2021, 13 pages (with machine translation).

Office Action in Taiwanese Appln. No. 109143242, dated Nov. 26, 2021, 24 pages (with machine translation).

Office Action in Taiwanese Appln. No. 109143863, dated Mar. 1, 2022, 11 pages (with machine translation).

Office Action in U.S. Appl. No. 15/864,146, dated Dec. 8, 2021, 73 pages.

Office Action in U.S. Appl. No. 15/864,146, dated Jan. 13, 2021, 37 pages.

Office Action in U.S. Appl. No. 15/864,146, dated Jun. 3, 2021, 55 pages.

Office Action in U.S. Appl. No. 16/004,635, dated Aug. 3, 2022, 24 pages.

Office Action in U.S. Appl. No. 16/004,635, dated Jun. 3, 2021, 44 pages.

Office Action in U.S. Appl. No. 16/004,635, dated Nov. 24, 2021, 34 pages.

Office Action in U.S. Appl. No. 16/004,671, dated May 26, 2022, 43 pages.

Office Action in U.S. Appl. No. 16/004,671, dated Nov. 17, 2021, 40 pages.

Office Action in U.S. Appl. No. 16/004,757, dated Dec. 20, 2021, 31 pages.

Office Action in U.S. Appl. No. 16/004,757, dated Jul. 14, 2022, 30 pages.

Office Action in U.S. Appl. No. 16/004,757, dated Jun. 8, 2021, 26 pages.

Office Action in U.S. Appl. No. 16/004,796, dated Apr. 8, 2021, 35 pages.

Office Action in U.S. Appl. No. 16/004,796, dated Aug. 4, 2022, 45 pages.

Office Action in U.S. Appl. No. 16/004,796, dated Sep. 16, 2021, 46 pages.

Office Action in U.S. Appl. No. 16/004,837, dated Jun. 6, 2022, 8 pages.

Office Action in U.S. Appl. No. 16/356,391, dated Mar. 8, 2022, 10 pages.

Office Action in U.S. Appl. No. 16/356,391, dated Nov. 9, 2021, 13 pages.

Office Action in U.S. Appl. No. 16/356,478, dated Mar. 3, 2022, 5 pages.

Office Action in U.S. Appl. No. 16/710,176, dated Jun. 9, 2022, 7 pages.

Panda et al., "Learning to Recognize Actions from Limited Training Examples Using a Recurrent Spiking Neural Model", arXiv, Oct. 19, 2017, 17 pages.

Paredes-Valles et al., "Unsupervised Learning of a Hierarchical Spiking Neural Network for Optical Flow Estimation: From Events to Global Motion Perception," IEEE Transactions on Pattern Analysis and Machine Intelligence, Mar. 5, 2019, 42(8):2051-2064.

wikipedia.org [online], "DBSCAN," Mar. 31, 2008, retrieved on Oct. 5, 2022, retrieved from URL <https://en.wikipedia.org/wiki/DBSCAN>, 8 pages.

wikipedia.org [online], "Harris corner detector," Apr. 21, 2019, retrieved on Oct. 5, 2022, retrieved on Oct. 5, 2022, retrieved from URL <https://en.wikipedia.org/wiki/Harri_corner_detector>, 6 pages.

wikipedia.org [online], "OPTICS algorithm," Jun. 12, 2010, retrieved Oct. 5, 2022, retrieved from URL <https://en.wikipedia.org/wiki/OPTICS_algorithm, 6 pages.

wikipedia.org [online], "Scale-invariant feature transform," Apr. 15, 2005, retrieved on Oct. 5, 2022, retrieved from URL <https://en.wikipedia.org/wiki/Scale-invariant_feature_transform>, 19 pages.

Office Action in U.S. Appl. No. 16/710,266, dated Nov. 17, 2022, 32 pages.

(56) References Cited

OTHER PUBLICATIONS

Achard et al., "A Resilient, Low-Frequency, Small-World Human Brain Functional Network with Highly Connected Association Cortical Hubs," Journal of Neuroscience, Jan. 4, 2006, 26(1):63-72.
Arai et al., "The Effects of Theta Precession on Spatial Learning and Simplicial Complex Dynamics in a Topological Model of the Hippocampal Spatial Map," PLOS Computational Biology, Jun. 19, 2014, 10(6):r1003651.
Astrivis [online], "Demo Scan Church Dec. 2016," Dec. 2, 2016, retrieved on Nov. 27, 2022, retrieved from URL <https://www.youtube.com/watch?v=xCgQ4aaB1Go>, 2 pages [Video Submission].
Bassett et al., "Dynamic reconfiguration of human brain networks during learning," PNAS, Apr. 18, 2011, 108(18):7641-7646.
Brown et al., "Structure of the Afferent Terminals in Terminal Ganglion of a Cricket and Persistent Homology," PLOS One, May 23, 2012, 7(5):e37278.
Chen et al., "Neural Representation of Spatial Topology in the Rodent Hippocampus," Neural Computation, Jan. 2014, 26(1):1-39.
Choi et al., "Abnormal metabolic connectivity in the pilocarpine-induced epilepsy rat model: A multiscale network analysis based on persistent homology," NeuroImage, Oct. 1, 2014, 99:226-236.
Chung et al., "Persistence Diagrams of Cortical Surface Data," Information Processing in Medical Imaging, 2009, pp. 386-397.
Crossley et al., "Cognitive relevance of the community structure of the human brain functional coactivation network," PNAS, Jun. 24, 2013, 110(28):11583-11588.
Dongjiang et al., "DXSLAM: A Robust and Efficient Visual SLAM System with Deep Features," ArXiv, Aug. 12, 2020, 8 pages.
Drakesmith et al., "Overcoming the effects of false positives and threshold bias in graph theoretical analyses of neuroimaging data," NeuroImage, Sep. 2015, 118:313-333.
Ellis et al., "Describing High-Order Statistical Dependence Using "Concurrence Topology," With Application to Functional MRI Brain Data," Homology, Homotopy and Applications, 2014, 16(1):245-264.
Garrison et al., "The (in)stability of functional brain network measures across thresholds," NeuroImage, Sep. 2015, 118:651-661.
Ginestet et al., "Brain Network Analysis: Separating Cost from Topology Using Cost-Integration," PLOS One, Jul. 28, 2018, 2011, 6(7):e21570.
International Search Report and Written Opinion in International Appln. No. PCT/EP2022/073852, dated Dec. 9, 2022, 18 pages.
Khalid et al., "Tracing the evolution of multi-scale functional networks in a mouse model of depression using persistent brain network homology," NeuroImage, Nov. 1, 2014, 101:351-363.
Kim et al., Morphological brain network assessed using graph theory and network filtration in deaf adults, Hearing Research, Sep. 2014, 315:88-98.
Langer et al., "The Problem of Thresholding in Small-World Network Analysis," PLOS One, Jan. 3, 2013, 8(1):e53199.
Lee et al., "Discriminative persistent homology of brain networks," 2011 IEEE International Symposium on Biomedical Imaging: From Nano to Macro, Mar. 30, 2011, pp. 841-844.
Lucky Robot [online], "ORB SLAM3: AR demo," Feb. 23, 2021, retrieved on Nov. 27, 2022, retrieved from URL <https://www.youtube.com/watch?v=c1ExX_IA5tM>, 2 pages [Video Submission].
Medaglia et al., "Cognitive Network Neuroscience," Journal of Cognitive Neuroscience, Aug. 1, 2015, 27(8):1471-1491.
Mur-Artal et al., "ORB-SLAM2: an Open-Source SLAM System for Monocular, Stereo and RGB-D Cameras," IEEE Transactions on Robotics, Oct. 5, 2015, 31(5):1147-1163.
Pirino et al., "A topological study of repetitive co-activation networks in in vitro cortical assemblies," Physical Biology, Jan. 5, 2015, 12(1):016007.
Singh et al., "Topological analysis of population activity in visual cortex," Journal of Vision, Jun. 2008, 8(8):11, 18 pages.
Stolz, "Computational Topology in Neuroscience," Dissertation for the Degree of Master of Science in Mathematical Modelling & Scientific Computing at the University of Oxford, Sep. 2014, 77 pages.
U.S. Appl. No. 17/783,976, filed Jun. 9, 2022, Markram.
U.S. Appl. No. 17/783,978, filed Jun. 9, 2022, Markram.
U.S. Appl. No. 17/783,981, filed Jun. 9, 2022, Markram.
U.S. Appl. No. 17/454,347, filed Nov. 10, 2021, Lüttgehetmann.
U.S. Appl. No. 16/004,635, filed Jun. 11, 2018, Markram.
U.S. Appl. No. 16/004,837, filed Jun. 11, 2018, Markram.
U.S. Appl. No. 16/004,796, filed Jun. 11, 2018, Markram.
U.S. Appl. No. 16/004,757, filed Jun. 11, 2018, Markram.
U.S. Appl. No. 16/004,671, filed Jun. 11, 2018, Markram.
U.S. Appl. No. 16/356,391, filed Mar. 18, 2019, Markram.
U.S. Appl. No. 16/356,478, filed Mar. 18, 2019, Hess.
U.S. Appl. No. 16/710,266, filed Dec. 11, 2019, Markram.
U.S. Appl. No. 16/710,205, filed Dec. 11, 2019, Markram.
U.S. Appl. No. 16/710,176, filed Dec. 11, 2019, Markram.
U.S. Appl. No. 17/783,961, filed Jun. 9, 2022, Markram.
U.S. Appl. No. 16/710,080, filed Dec. 11, 2019, Markram.
U.S. Appl. No. 15/864,146, filed Jan. 8, 2018, Reimann.
Ghosh et al., "Design and Construction of a Brain-like computer: A New class of Frequency-Fractal Computing Using Wireless Communication in a Supramolecular Organic, Inorganic System," Information, 2014, 5, 28-100.
International Search Report and Written Opinion in International Appln. No. PCT/EP2020/085716, mailed on Mar. 25, 2021, 14 pages.
Masulli et al., "Algebro-topological invariants in network theory," Int. J. Complex Systems in Science, Sep. 2015, 5(1):13-17.
Office Action in U.S. Appl. No. 16/004,757, dated Mar. 29, 2023, 36 pages.
Office Action in U.S. Appl. No. 16/004,796, dated Feb. 23, 2023, 31 pages.
Office Action in U.S. Appl. No. 16/710,205, dated May 10, 2023, 37 pages.
Office Action in U.S. Appl. No. 16/710,266, dated Apr. 12, 2023, 41 pages.
U.S. Appl. No. 16/004,635, dated Jun. 11, 2018, Markram.
U.S. Appl. No. 16/004,837 dated Jun. 11, 2018, Markram.
U.S. Appl. No. 16/004,796, dated Jun. 11, 2018, Markram.
U.S. Appl. No. 16/004,757, dated Jun. 11, 2018, Markram.
U.S. Appl. No. 16/004,671, dated Jun. 11, 2018, Markram.
U.S. Appl. No. 16/356,391, dated Mar. 18, 2019, Markram.
U.S. Appl. No. 18/295,959, dated Apr. 5, 2023, Henry.
U.S. Appl. No. 16/356,478, dated Mar. 18, 2019, Hess.
U.S. Appl. No. 18/167,958, dated Jan. 30, 2023, Hess.
U.S. Appl. No. 16/710,266, dated Dec. 11, 2019, Markram.
U.S. Appl. No. 16/710,205, dated Dec. 11, 2019, Markram.
U.S. Appl. No. 16/710,176, dated Dec. 11, 2019, Markram.
U.S. Appl. No. 18/167,958, dated Feb. 13, 2023, Markram.
U.S. Appl. No. 16/710,080, dated Dec. 11, 2019, Markram.
U.S. Appl. No. 18/295,969, dated Apr. 5, 2023, Henry.
U.S. Appl. No. 17/783,976, dated Jun. 9, 2022, Markram.
U.S. Appl. No. 17/783,978, dated Jun. 9, 2022, Markram.
U.S. Appl. No. 17/783,981, dated Jun. 9, 2022, Markram.
U.S. Appl. No. 17/454,347, dated Nov. 10, 2021, Lüttgehetmann.
U.S. Appl. No. 15/864,146, dated Jan. 8, 2018, Reimann.
U.S. Appl. No. 18/188,888, dated Mar. 23, 2023, Reimann.

* cited by examiner

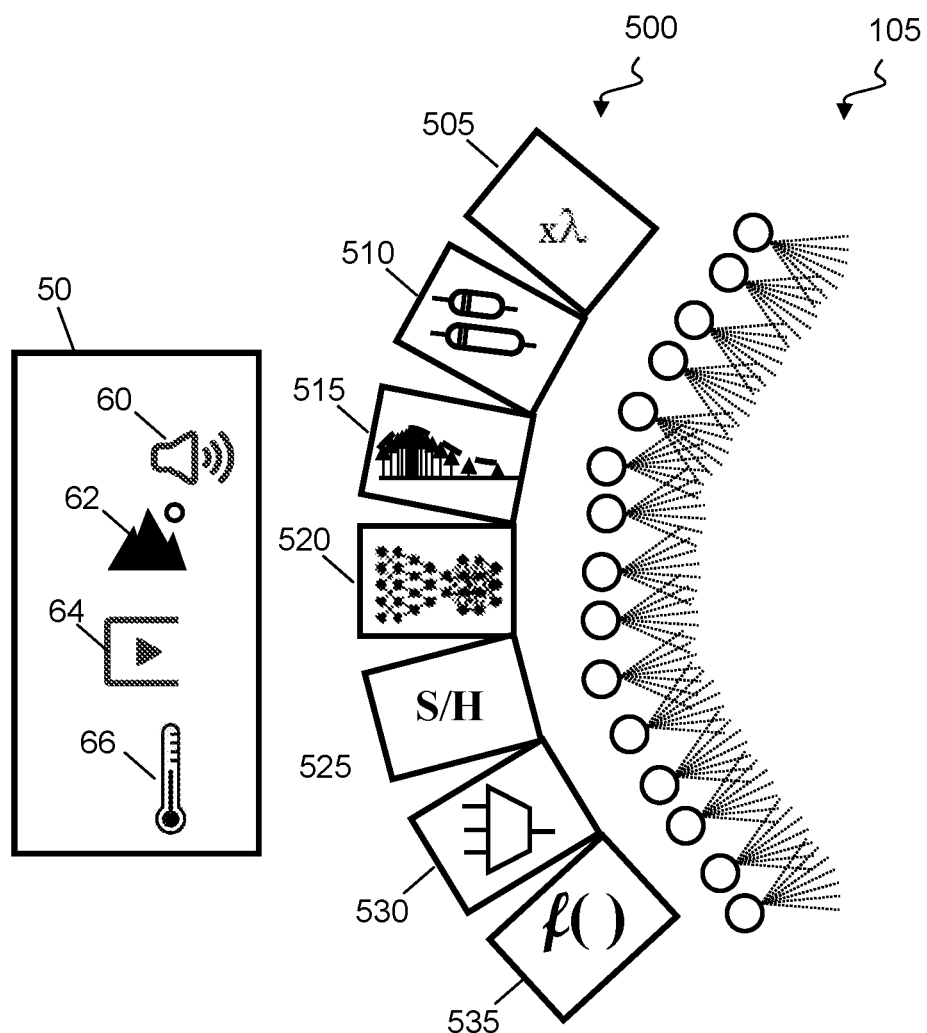
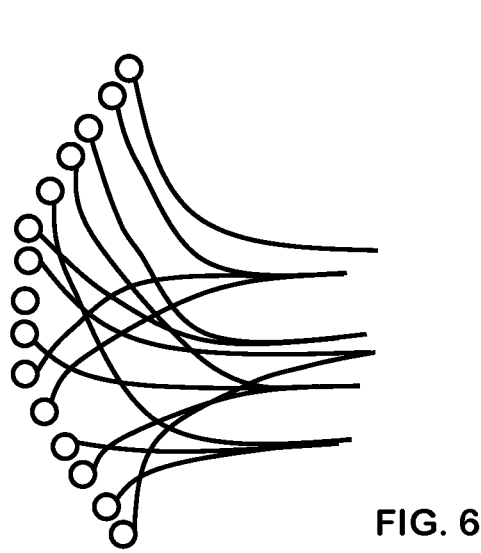
FIG. 5
FIG. 6

INPUT INTO A NEURAL NETWORK

TECHNICAL FIELD

This invention relates to artificial neural networks, and more particularly to abstracting data that originates from different sensors and transducers using artificial neural networks.

BACKGROUND

Artificial neural networks are devices that are inspired by the structure and functional aspects of networks of biological neurons. In particular, artificial neural networks mimic the information encoding and other processing capabilities of networks of biological neurons using a system of interconnected constructs called nodes. The arrangement and strength of connections between nodes in an artificial neural network determines the results of information processing or information storage by the artificial neural network.

Neural networks can be trained to produce a desired signal flow within the network and achieve desired information processing or information storage results. In general, training a neural network will change the arrangement and/or strength of connections between nodes during a learning phase. A neural network can be considered trained when sufficiently appropriate processing results are achieved by the neural network for given sets of inputs.

Because training is fundamental to the processing performed by neural networks, these neural networks are generally unable to process data that deviates in form or in content from the data in the training set. By way of example, a neural network image classifier that has been trained to classify images will likely produce meaningless results if audio data is input. As another example, a neural network that has been trained to cluster heart arrhythmias will generally not work if telecommunications signals are input.

SUMMARY

Abstracting data that originates from different sensors and transducers using artificial neural networks is described.

In one implementation, a method includes identifying topological patterns of activity in a recurrent artificial neural network and outputting a collection of digits. The topological patterns are responsive to an input, into the recurrent artificial neural network, of first data originating from a first sensor and second data originating from a second sensor. Each topological pattern abstracts a characteristic shared by the first data and the second data. The first and second sensors sense different data. Each digit represents whether one of the topological patterns of activity has been identified in the artificial neural network. Corresponding systems and apparatus, including computer programs encoded on a computer storage medium, are also possible.

In another implementation, a method includes identifying topological patterns of activity in a recurrent artificial neural network and outputting a collection of digits. Each of the topological patterns indicates performance of a specific operation in the recurrent artificial neural network on both first data originating from a first sensor and second data originating from a second sensor. The first and second sensors sense different data. Each digit represents whether one of the topological patterns of activity has been identified in the artificial neural network. Corresponding systems and apparatus, including computer programs encoded on a computer storage medium, are also possible.

In another implementation, a recurrent artificial neural network includes a first region that is configured to receive data originating from a first sensor, a second region that is configured to receive data originating from a second sensor, and a third region that is configured to receive results of processing by both the first region and by the second regions. The first region is primarily perturbed by data originating from the first sensor and the second region is primarily perturbed by data originating from the second sensor even when both regions are perturbed at the same time. The third region is configured to output indications of the presence of topological patterns of activity that are responsive to the results of the processing by the first region and by the second regions. Corresponding systems and apparatus, including computer programs encoded on a computer storage medium, are also possible.

In another implementation, a device includes a hierarchical system of recurrent artificial neural networks. A first level of the hierarchical system includes a first recurrent artificial neural network configured to receive data originating from a first sensor and to output first indications of the presence of topological patterns of activity responsive to the input of the data originating from the first sensor and a second recurrent artificial neural network configured to receive data originating from a second sensor and to output second indications of the presence of topological patterns of activity responsive to the input of the data originating from the second sensor, wherein the first and second sensors sense different data. A second level of the hierarchical system includes a third recurrent artificial neural network configured to receive the indications of the presence of topological patterns of activity in the first recurrent artificial neural network and the indications of the presence of topological patterns of activity in the second recurrent artificial neural network. The third recurrent artificial neural network is configured to abstract a characteristic of the shared by the first indications and the second indications. Corresponding systems and apparatus, including computer programs encoded on a computer storage medium, are also possible.

These and other implementations can include one or more of the following features. The first data originating from the first sensor and the second data originating from the second sensor can be input into the recurrent artificial neural network. The first and the second data can be input into the recurrent artificial neural network sufficiently close in time such that perturbations responsive to the input of the first and second data are present in the recurrent artificial neural network at the same time. The topological patterns of activity can be clique patterns. The clique patterns of activity can enclose cavities. A plurality of windows of time during which the activity of the artificial neural network is responsive to an input into the artificial neural network can be defined. The topological patterns of activity can be identified in each of the pluralities of windows of time. The first sensor can produce a stream of output data and the second sensor can produce slower changing or static output data. The slower changing or static output data can be rate coded. The rate coded data can be input into the recurrent artificial neural network at a same time as when the data that originates from the first transducer is input into the recurrent artificial neural network. Inputting the data originating from the first and second sensors can include delaying input of data originating from the first transducer to coordinate the input of the data originating from the first sensor with the input of the data originating from the second sensor. The input of data originating from the first sensor can be interrupted and identification of the topological patterns of activity and output the collection of digits can be continued during the interruption. Prior to the interruption, the identified topological patterns of activity can include a first pattern and during the interruption, the identified topological patterns of activity also includes the same first pattern. Inputting the data originating from the first and the second sensors can include scaling a magnitude of the data originating from the first sensor based on the data originating from the second sensor. Inputting the data originating from the first and the second sensors can include setting a parameter of the recurrent artificial neural network based on the data originating from the second sensor. Inputting the data originating from the first and the second sensors can include setting a parameter of an output of data from the recurrent artificial neural network based on the data originating from the second sensor. Inputting the data originating from the first and the second sensors can include inputting the data originating from the first sensor into a first region of the recurrent neural network, wherein the first region is primarily perturbed by data of the class that originates from the first sensor and inputting the data originating from the second sensor into a second region of the recurrent neural network, wherein the second region is primarily perturbed by data of the class that originates from the second sensor. The digits can be multi-valued and represent a probability that the topological pattern of activity is present in the artificial neural network. The first and second sensors can be first and second transducers that convert different physical properties into data. Third data originating from a third sensor can be input into the recurrent artificial neural network. The third sensor senses data that differs from the first and second data and the third data can be input into the recurrent artificial neural network such that perturbations responsive to the input of the first data, the second data, and third data are present in the recurrent artificial neural network at the same time. Topological patterns of activity that abstract a characteristic shared by the first data, the second data, and the third data can be identified.

Each of the first regions and the second regions can be an identifiably discrete collection of nodes and edges with relatively few node-to-node connections between each region. The first region can configured to output indications of the presence of topological patterns of activity that are primarily responsive to the input of the data originating from the first sensor. The first sensor can produce a stream of output data and the second sensor can produce slower changing or static output data. A rate coder can be coupled to rate code the slower changing or static output data and input the rate coded data into the second region at a same time as when the data that originates from the first sensor is input into the first region. A means for scaling can scale a magnitude of the data originating from the first sensor prior to receipt by the first region, wherein the scaling is based on the data originating from the second sensor. An input can be coupled to inject some of the data originating from the first sensor into a node or link of the recurrent neural network. The input can include a delay or a scaling element. A magnitude of the delay or of the scaling can be based on the data originating from the second sensor. A first level of the hierarchical system can include a third recurrent artificial neural network configured to receive data originating from a third sensor and to output third indications of the presence of topological patterns of activity responsive to the input of the data originating from the third sensor. The third recurrent artificial neural network can be configured to receive the third indications of the presence of topological patterns of activity in the third recurrent artificial neural network and to abstract a characteristic of the shared by the first indications, the second indications, and the third indications.

The details of one or more implementations are set forth in the accompanying drawings and the description below. Other features, objects, and advantages of the invention will be apparent from the description and drawings, and from the claims.

DESCRIPTION OF DRAWINGS

FIG. 5 is a schematic representation of a variety of processing actions that can be performed on data that originates from different sensors prior to input into a neural network.

FIGS. 6-10 are schematic representations of approaches for inputting data that originates from different sensors into neural network.

Like reference symbols in the various drawings indicate like elements.

DETAILED DESCRIPTION

Figure 1:
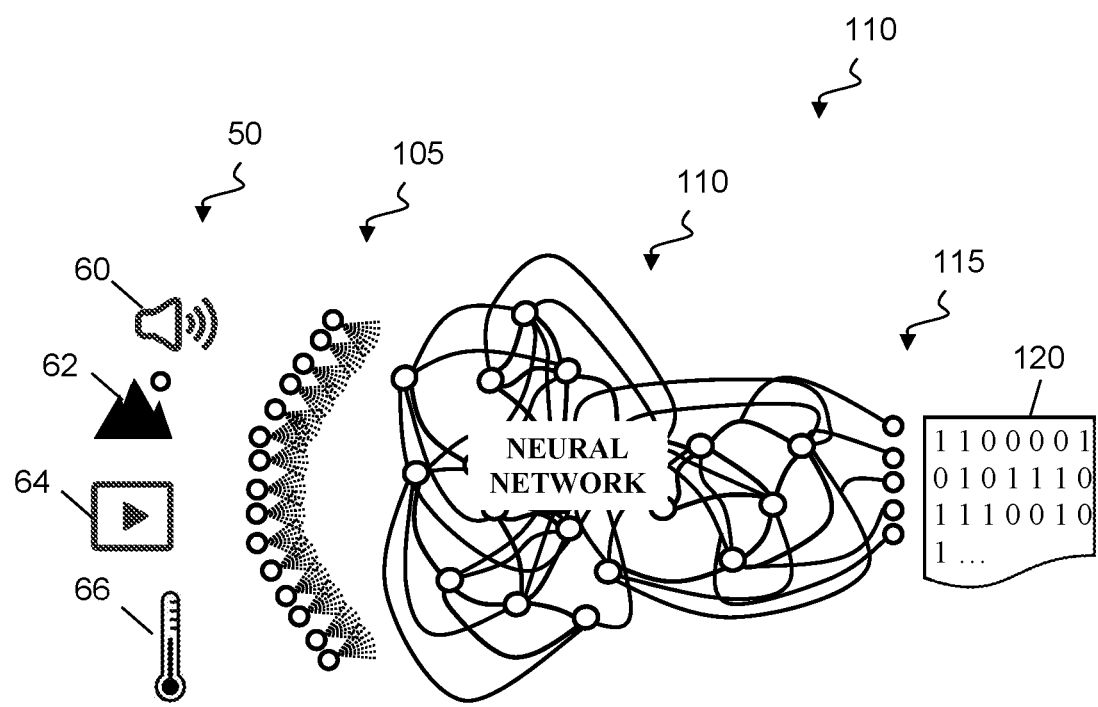
FIG. 1 is a schematic representation of an implementation of an artificial neural network system that abstracts data that originates from multiple, different sensors.

FIG. 1 is a schematic representation of an implementation of an artificial neural network system 100 that abstracts data 50 that originates from multiple, different sensors. Neural network system 100 includes a collection of inputs 105, the neural network 110 itself, and a collection of outputs 115. Neural network 110 can receive data 50 that originates from multiple, different sensors over inputs 105. The sensors can be, e.g., transducers that convert different physical properties into data or devices that sense only data, such as, e.g., a device that senses the content of a document or data stream. The abstraction of data 50 by neural network 110 can be read from outputs 115 as, e.g., a collection of (generally binary) digits 120 that each represent the presence or absence of a respective topological pattern of activity in neural network 110 responsive to input data 50. These responsive patterns of activity represent a specific operation performed by the neural network 110 on input data 50. The operation can be arbitrarily complex. A single digit can thus encode an arbitrarily complex operation and a set of digits can convey a set operations, each with an arbitrary level of complexity.

Further, the topological patterns of activity—and their representation in digits 120—can be "universal" in the sense that they are not dependent on the origin of the data being input into the neural network. Rather, the topological patterns of activity express abstract characteristics of the data 50 that is being input into neural network 110—regardless of the origins of that data.

In more detail, data 50 may originate from different sensors and have different formats. For example, certain classes of data 50 (e.g., video or audio data) may change relatively rapidly in time, whereas other classes of data 50 (e.g., still image or temperature) may change relatively slowly or not at all. Notwithstanding the different origins and formats, neural network 110 can still abstract characteristics from the data. For example, neural network 110 may abstract:

physical traits (e.g., color, shape, orientation, speed), categories (e.g., car, cat, dog), and/or abstract qualitative traits (e.g., "alive" vs. "dead," "smooth" vs. "rough," "animate" vs. "inanimate," "hot" vs. "cold," "open" vs. "closed").

The topological patterns of activity—and their representation in digits 120—are the response of neural network 110 to the diverse data 50. Typically, multiple topological patterns of activity will arise in response to a single input, whether the input is discrete (e.g., a still photo or a single reading from a transducer that measures a physical parameter) or continuous (e.g., a video or an audio stream).

At times, neural network 110 will respond to the input of data 50 that originates from different sensors with one or more topological patterns that are the same, even if other topological patterns are different. For example, neural network 110 may respond to either a temperature reading or a still image of a desert with a topological pattern that represents a qualitative assessment of "hot," even if other topological patterns are also part of the response to each input. Similarly, neural network 110 can respond to the conclusion of a musical composition or a still image of a plate with crumbs with a topological pattern that represents a qualitative assessment of "done," even if other topological patterns are also part of the response to each input. Thus, at times, the same characteristic may be abstracted from data that has different origins and different formats.

At times, neural network 110 will respond to the input of data 50 that originates from different sensors with one or more topological patterns that represent the synthesis or fusion of the characteristics of the data from those sensors. In other words, a single such pattern can represent an abstraction of the same characteristic that is present in different types of data. In general, the fusion or synthesis of data from different sensors will act to cause such patterns to arise or the strength of the activity of such patterns to increase. In other words, data from different sensors can act as "corroborative evidence" that the same characteristic is present in the diverse input data.

In some cases, topological patterns that represent the synthesis or fusion of the characteristics of data from different sensors will only arise if certain characteristics are present in the data from different sensors. Neural network 110 can in effect act as an AND gate and require that certain characteristics in data from different sensors in order for certain patterns of activity to arise. However, this need not be the case. Instead, the magnitude of the activity that forms a pattern may increase or the timing of the activity may shorten in response to data from different sensors. In effect, the topological patterns of activity—and their representation in digits 120—represent abstractions of the characteristics of data 50 in a very rich state space. In other words, the topological patterns of activity and their representation are not necessarily the predefined "results" of processing input data in the sense that, e.g., a yes/no classification is the predefined result yielded by a classifier, a set of related inputs is the predefined result yielded by a clustering device, or a prediction is the predefined result yielded by a forecasting model. Rather, the topological patterns are abstractions of the characteristics the input data. Although that state space may at times include abstractions such as a yes/no classification, the state space is not limited to only those predefined results.

Further, the topological patterns may abstract characteristics of only a portion (e.g., a particular region of an image or a particular moment in a video or audio stream or a particular detail of the input such as a pixel) of the input data, rather than the entirety of the input data. Thus, the state space of the abstractions is neither limited to either a predefined type of result (e.g., a classification, a cluster, or a forecast), nor to abstractions of the entirety of the input data. Rather, the topological patterns are a tool that allows the processing by a high-dimensional, non-linear, recurrent dynamic system (i.e., neural network 110) to be read. The topological patterns extract correlates of the data from the different sensors that arise in neural network 110, including correlates that fuse the data into a more complete "whole."

Upon input of data 50, neural network 110 will respond with a certain activity. That activity will include:

activity that does not comport with defined topological patterns, and activity that does comport with defined topological patterns.

The activity in neural network 110 that does not comport with defined topological patterns can in some cases be incorrect or incomplete abstractions of the characteristics of the input data 50. Further, the activity in neural network 110 that does comport with defined topological patterns can abstract different characteristics of the input data 50. Each of the abstracted characteristics may be more or less useful depending on the application. By limiting digits 120 to representation of certain topological patterns, both incorrect or incomplete abstractions and abstraction of characteristics that are not relevant to a particular application can be "filtered out" and excluded from digits 120.

In the illustrated implementation, data 50 includes one or more of sound data 60 that originates from, e.g., a microphone, still image data 62 that originates from, e.g., a still camera, video data 64 that originates from, e.g., a video camera, and temperature data 66 that originates from, e.g., a temperature sensor. This is for illustrative purposes only. Data 50 need not include one or more of sound data 60, still image data 62, video data 64, temperature data 66. Also, data 50 can include one or more of a variety of other different types of data including, e.g., pressure data, chemical composition data, acceleration data, electrical data, position data, or the like. As discussed further below, data 50 that originates from a sensor can undergo one or more processing actions prior to input into neural network 110. Examples of such processing actions include, e.g., non-linear processing in an artificial neural network device.

As discussed above, the topological patterns that arise in neural network 110 are abstractions of the characteristics the input data 50 in a rich state space. If one were to constrain data 50 to originating from a small number of sensors, it may be unlikely that neural network 110 would abstract the data from that sensor in certain ways. By way of example, it may be unlikely that neural network 110 would abstract temperature data 66 by itself into a pattern of activity that corresponds to a spatial trait like shape or orientation. However, as data from different sensors is input into neural network 110, the perturbations provoked by diverse input data 50 meet each other and can collectively influence the activity in neural network 110. As a result, the neural network 110 may abstract input data 50 into different or more certain patterns of activity.

For example, there may be a degree of uncertainty associated with the presence or absence of a pattern. If data 50 includes data from diverse range of sensors, both the diversity of the patterns and the certainty of the patterns may increase as the data 50 that originates from different sensors is synthesized or fused within the neural network 110. By way of analogy, a passenger who is sitting in a train at a train station may look out the window and see an adjacent train that appears to be moving. That same passenger may also, e.g., feel forward pressure from the seat. The fusion or synthesis of this information increases the passenger's degree of certainty that the passenger's train is moving, rather than the adjacent train. When neural network receives diverse input data 50, the perturbations provoked by that data can collectively be abstracted into different or more certain patterns of activity.

The ability of neural network 110 to process input data 50 from diverse sensors also provides a degree of robustness to the abstraction of that data. By way of example, one sensor of a group may become inaccurate or even inoperative and yet neural network 110 can continue to abstract data 50 from the other sensors. Often, neural network 110 will abstract data 50 from the other sensors into the same patterns of activity that would have arisen had all of the sensors been functioning as designed. However, in some instances, the certainty of those abstractions may decrease. Nevertheless, abstraction can continue even if such a problem should arise.

In the illustrated implementation, inputs 105 are schematically represented as a well-defined input layer of nodes that each passively relay the input to one or more locations in neural network 110. However, this is not necessarily the case. For example, in some implementations, one or more of inputs 105 can scale some portion or all of the input data or perform other preliminary processing before data is conveyed to neural network 110. As another example, data 50 may injected into different layers and/or edges or nodes throughout neural network 110, i.e., without a formal input layer as such. For example, a user can specify that data is to be injected into specific nodes or links that are distributed throughout network 110. As another example, neural network 110 need not be constrained to receiving input in a known, previously defined manner (e.g., always injecting a first bit into a first node, the second bit into a second node, . . . etc.). Instead, a user can specify that certain bits in the data are to be injected into edges rather than nodes, that the order of injection need not follow the order that the bits appear, or combinations of these and other parameters. Nevertheless, for the sake of convenience, the representation of inputs 105 as an input layer will be maintained herein.

In the illustrated implementation, neural network 110 is schematically illustrated as a recurrent neural network. In recurrent neural networks, the connections between nodes form a directed graph along a temporal sequence and the network exhibits temporal dynamic behavior. In some implementations, neural network 110 is a relatively complex neural network that is modelled on a biological system. In other words, neural network 110 can itself model a degree of the morphological, chemical, and other characteristics of a biological system. In general, neural networks 110 that are modelled on biological systems are implemented on one or more computing devices with a relatively high level of computational performance.

In contrast with, e.g., traditional feedforward neural networks, neural networks 110 that are modelled on biological systems may display background or other activity that is not responsive to input data 50. Indeed, activity may be present in such neural networks 110 even in the absence of input data 50.

However, upon input of data 50, a neural network 110 will be perturbed. Since the response of such a neural network 110 to a perturbation may depend, in part, on the state of neural network 110 at the time that data 50 is input, the response of such a neural network 110 to the input of data 50 may also depend on the background or other activity that is already present in neural network 110.

Nevertheless, even though such activity in a neural network is not responsive only to the input of data 50, it is responsive to input data 50. Digits 120 can thus represent the presence or absence topological structures that arise in the patterns of activity responsive to the input data even in a relatively complex neural network that is modelled on biological systems.

In the illustrated implementation, outputs 115 are schematically represented as a multi-node output layer. However, outputs 115 need not be a multi-node output layer. For example, output nodes 115 can be individual "reader nodes" that identify occurrences of a particular pattern of activity at a particular collection of nodes in neural network 110 and hence read the output of neural network 110. The reader nodes can fire if and only if the activity at a particular collection of nodes satisfies timing (and possibly magnitude or other) criteria. For example, output nodes 115 can be connected to a collection of nodes in neural network 110 and indicate the presence or absence topological structures based on, e.g., the activity levels of each individual node crossing a respective threshold activation level, a weighted sum of the activity levels of those nodes crossing a threshold activation level, or a non-linear combination of the activity levels of those nodes crossing a threshold activation level.

The output received over outputs 115 is collection of digits 120 that each represent the presence or absence of a respective pattern of activity in neural network 110, which can be implemented as a relatively complex neural network that models characteristics of a biological system. Collection 120 is only schematically illustrated and collection 120 can be, e.g., one-dimensional vector of digits, a two-dimensional matrix of digits, or other collection of digits. In general, the digits in collection 120 will be binary and indicate in a yes/no manner whether a pattern of activity is present or not. However, this is not necessarily the case. Instead, in some implementations, the digits in collection 120 will be multi-valued. The values can denote characteristics of the presence or absence of a respective pattern of activity in neural network 110. For example, the values can indicate the strength of the activity or a statistical probability that a specific pattern of activity is in fact present. By way of example, activity that is relatively large in magnitude or that occurs within a relatively short window of time can be considered as indicating that a specific operation has been performed or was likely to have been performed. In contrast, activity that is relatively small in magnitude or that occurs over a relatively longer time can be considered less likely to indicating that a specific operation has been performed.

The information in collection 120 is holographically represented in the sense that information about the value of a single digit is distributed across the values of other digits in the collection 120. In other words, random subsets of digits in collection 120 also contain information about the operations performed by the neural network 110 in response to input 50, just at lower resolution than would be present if all the digits in collection 120 were present. As discussed further below, different topological patterns have different degrees of complexity. Some relatively more complex patterns may include relatively less complex patterns and simple patterns can be assembled into more complex patterns. Moreover, relatively high levels of abstraction that are represented by some digits may be correlated to some extent with other abstractions represented by other digits. For example, a digit that represents the occurrence of an abstract qualitative trait like "alive" may be correlated with a digit that represents a qualitative trait like "animate." Information about the occurrence of some topological patterns thus inherently includes some information about the occurrence of other topological patterns.

For the sake of convenience, the remainder of the application will refer to the digits of collection 120 as binary bits and the FIGS. will illustrate them as such. However, it is to be understood that in all cases the digits of collection 120 can also be multi-valued to encode various aspects of the operations performed by the network.

Figure 2:
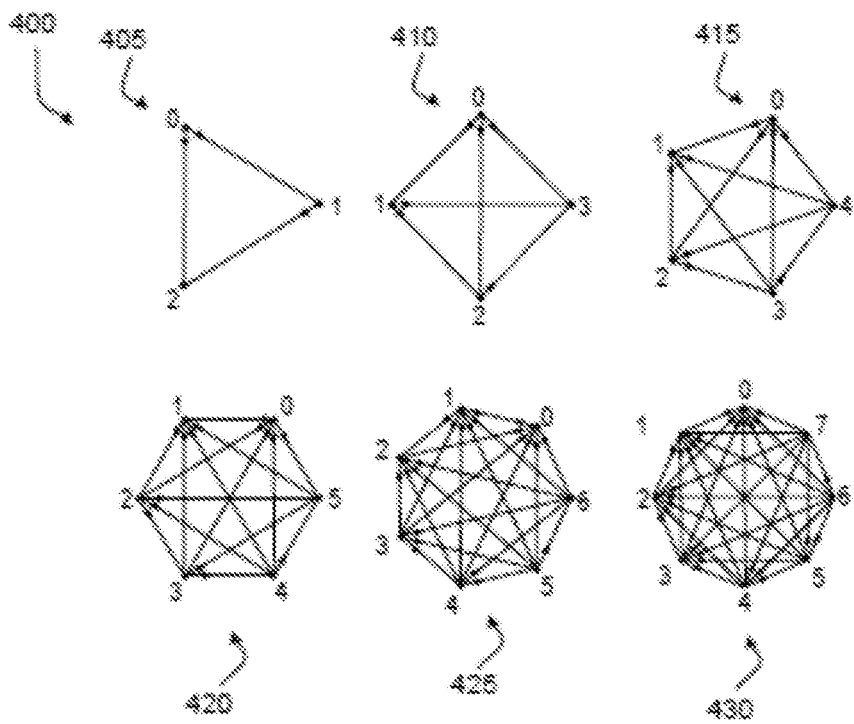
FIGS. 2 and 3 are representations of patterns of activity that can be identified and "read" to generate a collection of digits from neural network.

FIG. 2 is a representation of patterns 400 of activity that can be identified and "read" to generate collection 120 from neural network 110 (FIG. 1).

Patterns 400 are representations of activity within a recurrent artificial neural network. To read patterns 400, a functional graph is treated as a topological space with nodes as points. Activity in nodes and links that comports with patterns 400 can be recognized as ordered regardless of the identity of the particular nodes and/or links that participate in the activity. In the illustrated implementation, patterns 400 are all directed cliques or directed simplices. In such patterns, activity originates from a source node that transmits signals to every other node in the pattern. In patterns 400, such source nodes are designated as point 0 whereas the other nodes are designated as points 1, 2, . . . . Further, in directed cliques or simplices, one of the nodes acts a sink and receives signals transmitted from every other node in the pattern. In patterns 400, such sink nodes are designated as the highest numbered point in the pattern. For example, in pattern 405, the sink node is designated as point 2. In pattern 410, the sink node is designated as point 3. In pattern 415, the sink node is designated as point 3, and so on. The activity represented by patterns 400 is thus ordered in a distinguishable manner.

Each of patterns 400 has a different number of points and reflects ordered activity in a different number of nodes. For example, pattern 405 is a 2D-simplex and reflects activity in three nodes, pattern 410 is a 3D-simplex and reflects activity in four nodes, and so on. As the number of points in a pattern increases, so does the degree of ordering and the complexity of the activity. For example, for a large collection of nodes that have a certain level of random activity within a window, some of that activity may comport with pattern 405 out of happenstance. However, it is progressively more unlikely that random activity will comport with the respective of patterns 410, 415, 420 . . . . The presence of activity that comports with pattern 430 is thus indicative of a relatively higher degree of ordering and complexity in the activity that the presence of activity that comports with pattern 405.

Different duration windows can be defined for different determinations of the complexity of activity. For example, when activity that comports with pattern 430 is to be identified, longer duration windows can be used than when activity that comports with pattern 405 is to be identified.

Figure 3:
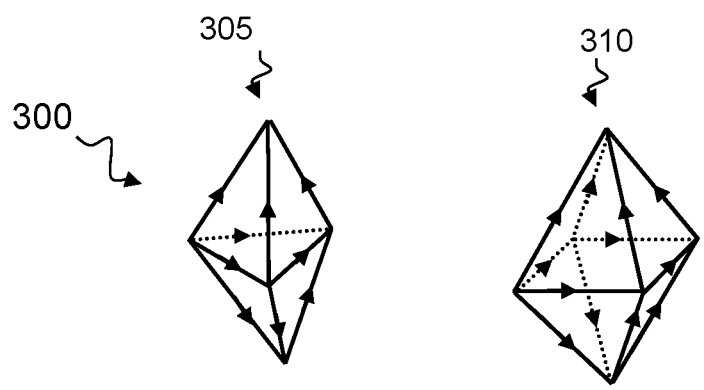

FIG. 3 is a representation of patterns 300 of activity that can be identified and "read" to generate binary digit collection 120 from neural network 110 (FIG. 1).

Patterns 300 are groups of directed cliques or directed simplices of the same dimension (i.e., have the same number of points) that define patterns involving more points than the individual cliques or simplices and enclose cavities within the group of directed simplices.

By way of example, pattern 305 includes six different three point, 2-dimensions patterns 405 that together define a homology class of degree two, whereas pattern 310 includes eight different three point, 2-dimensions patterns 405 that together define a second homology class of degree two. Each of the three point, 2-dimensions patterns 405 in patterns 305, 310 can be thought of as enclosing a respective cavity. The nth Betti number associated with a directed graph provides a count of such homology classes within a topological representation.

The activity represented by patterns such as patterns 300 represents a relatively high degree of ordering of the activity within a network that is unlikely to arise by random happenstance. Patterns 300 can be used to characterize the complexity of that activity.

In some implementations, only some patterns of activity are identified and/or some portion of the patterns of activity that are identified are discarded or otherwise ignored. For example, with reference to FIG. 2, activity that comports with the five point, 4-dimensional simplex pattern 415 inherently includes activity that comports with the four point, 3-dimensional and three point, 2-dimension simplex patterns 410, 405. For example, points 0, 2, 3, 4 and points 1, 2, 3, 4 in 4-dimensional simplex pattern 415 of FIG. 2 both comport with 3-dimensional simplex pattern 410. In some implementations, patterns that include fewer points— and hence are of a lower dimension—can be discarded or otherwise ignored. As another example, only some patterns of activity need be identified. For example, in some implementations only patterns with odd number of points (3, 5, 7, . . . ) or even numbers of dimensions (2, 4, 6, . . . ) are identified. Notwithstanding the identification of only some patterns, information about the activity in the neural network can nevertheless be holographically represented, i.e., at lower resolution that if all patterns of identified and/or represented in an output.

As discussed above, the patterns of activity that are responsive to input data 50 represent a specific operation of arbitrary complexity performed by the neural network 110 on that input data 50. In some implementations, the complexity of the operation will be reflected in the complexity of the topological pattern. For example, the operation or abstraction represented by the five point, 4-dimensional simplex pattern 415 may be more complex than the operations or abstractions represented by the four point, 3-dimensional and three point, 2-dimension simplex patterns 410, 405. In such cases, digits that represent the presence of activity convey that a set operations or abstractions is performed in neural network 110, where each of these operations or abstractions has an arbitrary level of complexity.

Figure 4:
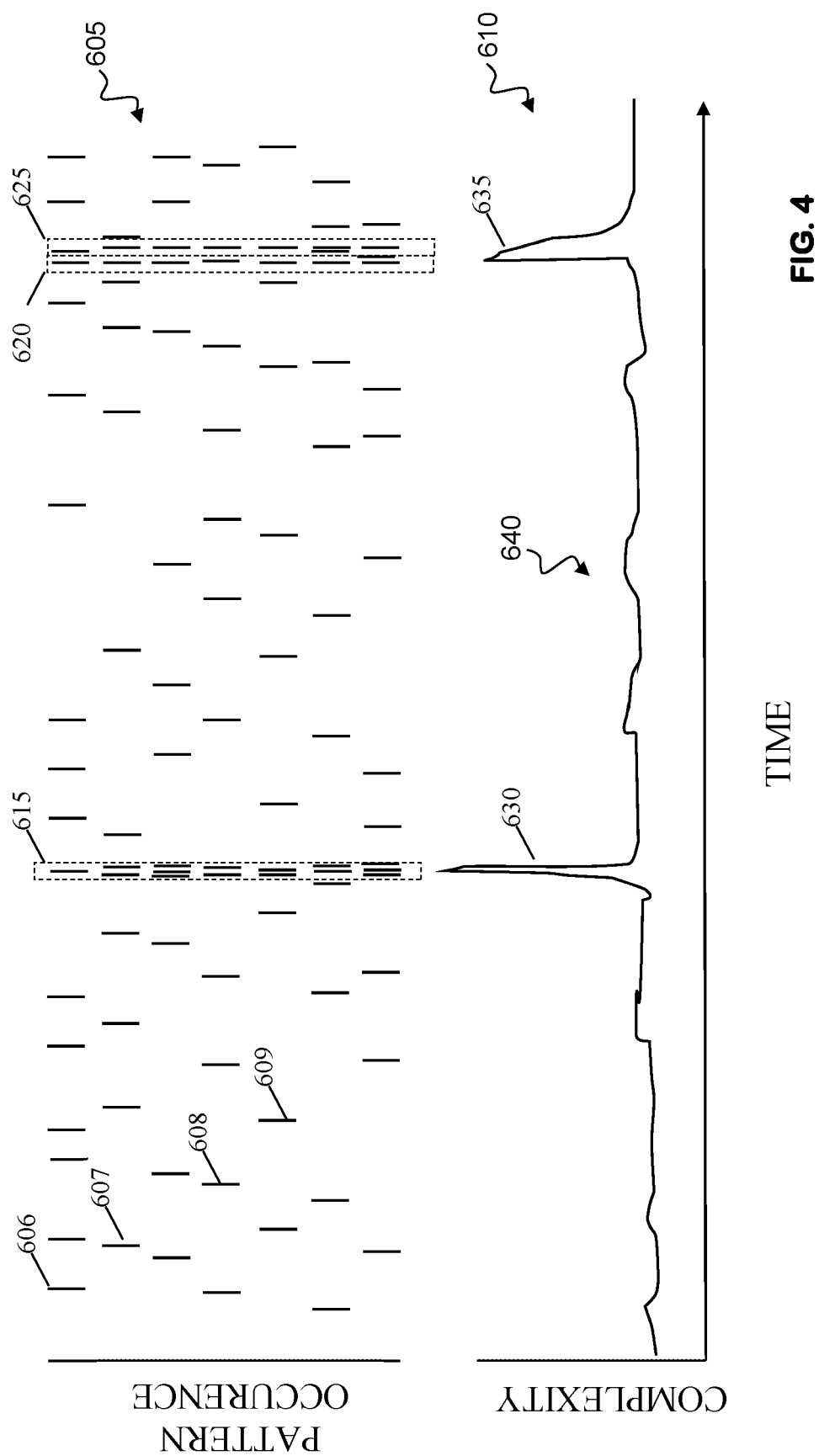
FIG. 4 is a graph that represents occurrences of patterns as a function of time.

FIG. 4 is a schematic representation of a determination of the timing of activity patterns that have a distinguishable complexity. The determination represented in FIG. 4 can be performed as part of an identification or "reading" of patterns of activity to generate binary digit collection 120 from neural network 110 (FIG. 1).

FIG. 4 includes a graph 605 and a graph 610. Graph 605 represents occurrences of patterns as a function of time along the x-axis. In particular, individual occurrences are represented schematically as vertical lines 606, 607, 608, 609. Each row of occurrences can be instances where activity matches a respective pattern or class of pattern. For example, the top row of occurrences can be instances where activity matches pattern 405 (FIG. 2), the second row of occurrences can be instances where activity matches pattern 410 (FIG. 2), the third row of occurrences can be instances where activity matches pattern 415 (FIG. 2), and so on.

Graph 605 also includes dashed rectangles 615, 620, 625 that schematically delineate different windows of time when the activity patterns have a distinguishable complexity. As shown, the likelihood that activity in the recurrent artificial neural network matches a pattern indicative of complexity is higher during the windows delineated by dashed rectangles 615, 620, 625 than outside those windows.

Graph 610 represents the complexity associated with these occurrences as a function of time along the x-axis. Graph 610 includes a first peak 630 in complexity that coincides with the window delineated by dashed rectangle 615 and a second peak 635 in complexity that coincides with the window delineated by dashed rectangles 620, 625. As shown, the complexity represented by peaks 630, 635 is distinguishable from what can be considered to be a baseline level 640 of complexity.

In some implementations, the times at which the output of a recurrent artificial neural network is to be read coincide with the occurrences of activity patterns that have a distinguishable complexity. For example, in the illustrative context of FIG. 4, the output of a recurrent artificial neural network can be read at peaks 630, 635, i.e., during the windows delineated by dashed rectangles 615, 620, 625.

In some implementations, not only the content but also the timing of the activity patterns that have a distinguishable complexity can be output from the recurrent artificial neural network. In particular, not only the identity and activity of the nodes that participate in activity that comports with the activity patterns, but also the timing of the activity patterns can be considered the output of the recurrent artificial neural network. The identified activity patterns as well as the timing when this decision is to be read can thus represent the result of processing by the neural network.

FIG. 5 is a schematic representation of a variety of processing actions 500 that can be performed on data 50 that originates from different sensors prior to input into neural network 110. As before, the particular types of data and particular structure of inputs 105 are only illustrative.

For example, data 50 that originates from an input sensor can be scaled 505 prior to input into inputs 105. The magnitude of the scaling can be chosen based not only on the characteristics of neural network 110 but also based on the characteristics of the other data 50 that is input into neural network 110. For example, if a relatively large amount of data 50 is to be input into neural network 110, individual data points can be scaled by a relatively small scalar to maintain compatibility with, e.g., firing thresholds and other characteristics of neural network 110. On the other hand, if a relatively small amount of data 50 is to be input into neural network 110, individual data points can be scaled by a relatively larger scalar to maintain compatibility with, e.g., firing thresholds and other characteristics of neural network 110.

As yet another example, scaling can be used to implement an amplitude-coding scheme. For example, rather than attempting to input a binary or other representation of parameters such as color and temperature into neural network 110, the same parameters can be encoded using amplitude.

As another example, data 50 that originates from an input sensor can be delayed 510 prior to input into inputs 105. The input of some data can be delayed so that data that originates from different sensors can be synchronized or otherwise coordinated in time. For example, the arrival of data 50 can be timed, e.g., to ensure that the results of processes that require different durations to complete can be input at the same time, to ensure that inhibitory or excitatory effects are properly timed, or to ensure that different stimuli arrive sufficiently close in time that activation thresholds are reached. Delays can also be used to implement logic functions, e.g., to time different stimuli so that one stimulus always arrives during any refractory period resulting from an earlier stimulus. As yet another example, delays can be used to implement network-wide policies that specify, e.g., the number of active nodes at a given time, the amount of input received during a particular window of time, or the like.

As yet another example, delays can be used to implement a phase-coding scheme. For example, rather than attempting to input a binary or other representation of parameters such as color and temperature into neural network 110, the same parameters can be encoded using the timing of input into neural network 110.

As another example, data 50 that originates from an input sensor can be rate coded 515 prior to input into inputs 105. Rate coding converts the magnitude of a value into a firing rate, e.g., the frequency at which an input signal is presented on inputs 105.

In some implementations, rate coding can be used to input different frequency data 50 into a single neural network 110, e.g., in the same manner or at the same time. In other words, slow-changing or static data 50 can perturb neural network 110 over a relatively longer period of time. By extending the duration of an input, slow-changing or static data 50 can perturb neural network 110 in a manner that is more akin to the manner in which more dynamic data 50 that changes relatively quickly perturbs neural network 110.

By way of example, still image data 62 is by definition "still," i.e., the values of individual pixels in the image do not change over time. In contrast, video or audio data is dynamic and the values of individual pixels vary over time. Rather than, e.g., perturbing neural network 110 one time only with inputs that are scaled to the color or other characteristic(s) of individual pixels in still image data 62, the same characteristic(s) can be rate coded into a series of inputs that perturb neural network 110 over time. Such a perturbation can be input, e.g., in the same manner or at the same time as other perturbations that change with time, such as an audio or video signal.

As another example, data 50 that originates from an input sensor can be processed 520 using one or more other neural networks prior to input into inputs 105. The other neural network(s) can have been trained to arrive at a particular result such as, e.g., classifications of input data, clustering of inputs, or a forecast.

As another example, data 50 that originates from an input sensor can be processed 525 to convert dynamic input data into less-dynamic or even static input data. By way of example, video data 64 is dynamic in that it generally changes from one instant to the next, e.g., from frame to frame.

Rather than, e.g., perturbing neural network 110 at the same frame rate as video data 64, video data 64 can be down-sampled in time and input into neural network 110 in the same manner as one would input a series of discrete still images. For example, a particular frame of the video data 64 can be sampled and held on the input of neural network 110 until neural network 110 re-enters a quiescent or other state indicating that abstraction of that particular sample of the video data 64 is complete.

In some implementations, such down-sampling can be used to input different frequency data 50 into a single neural network 110, e.g., in the same manner or at the same time. For example, down-sampled video data 64 can be input in the same manner or at the same time as static still image data 62.

As another example, different data 50 can be multiplexed 525 for input into neural network 110. For example, a single node or edge in neural network 110 can receive data 50 that originates from different sensors. A number of different schemes can be used to multiplex the input. For example, different data from different sensors can be input into a single node or edge in neural network 110 at different times (time-division multiplexing). As another example, different data from different sensors can be input into a single node or edge in neural network 110 at different frequencies (frequency-division multiplexing).

As another example, different data 50 can be processed 530 according to a linear or other function prior to input into neural network 110. For example, data 50 can be filtered, classified, encoded, or otherwise processed prior to input. The results of the processing can be input into neural network 110.

FIG. 6 is a schematic representation of an approach for inputting data 50 that originates from different sensors into neural network 110. As shown, each of inputs 105 has at least one projection that extends to, e.g., a node or edge in neural network 110. In some cases, projections from different inputs 105 may extend to the same node or edge in neural network 110. Each node or edge can receive a combined input that represents, e.g., a linear superposition or other combination of input received from different sensors.

Figure 7:
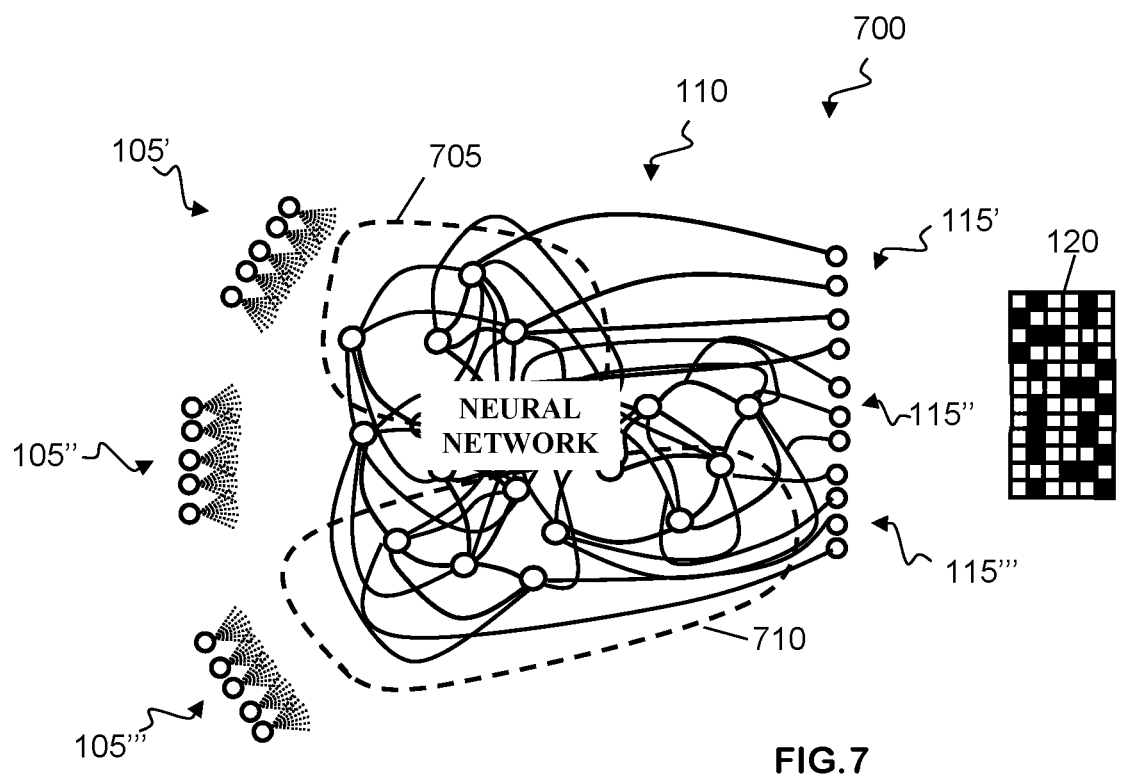

FIG. 7 is a schematic representation of another approach for inputting data 50 that originates from different sensors into neural network 110. In the illustrated implementation, different subsets 105', 105", 105''' of network inputs 105 are dedicated to receiving different types of input data. For example, a first subset 105' can be dedicated to receiving a first class of input data (e.g., data that originates from a first sensor) whereas a second subset 105' can be dedicated to receiving a second class of input data (e.g., data that originates from a second sensor).

In some implementations, corresponding "regions" 705, 710 of neural network 110 receive different classes of input data from different subsets 105', 105", 105''' of network inputs 105. For example, in the schematic illustration, regions 705, 710 are shown spatially discrete collections of nodes and edges with relatively few node-to-node connections between each region. This is not necessarily the case. Rather, the nodes and edges of each region 705, 710 can be spatially distributed within neural network 110 but yet receive a particular class of input data.

Regardless the distribution of the nodes in each region 705, 710, the processing in each region 705, 710 is primarily—but not necessarily exclusively—perturbed by the respectively received class of input data. The extent of perturbation can be measured based on the activity that occurs in a region with and without the respective class of input data being present. For example, a region that is primarily perturbed by a first class of input data may respond to the first class of input data in generally the same manner regardless of whether other classes of input data perturb network 110 at the same time. The processing and abstractions performed by each region 705, 710 are primarily influenced by the received class of input data. Nevertheless, the topological patterns of activity that arise in each region 705, 710 can be read as a digit collection 120. The same is true for other regions of recurrent neural network 110.

This schematically represented in neural network system 700 by separately designating different subsets 115', 115", 115''' of network outputs 115. In particular, subset 115' can be dedicated to outputting digits that represent topological patterns of activity that arise in region 705 of neural network 110, whereas subset 115''' can be dedicated to outputting digits that represent topological patterns of activity that arise in region 710 of neural network 110. However, subset 115" outputs digits that are not found in either of regions 705, 710. Indeed, the digits that are output in subset 115" may represent a fusion or further abstraction of the abstract representations and processing results that arise in regions 705, 710 to a higher level of complexity.

For example, a given digit in subset 115" may arise if and only if both one or more digits in subset 115' and one or more digit in subset 115''' have certain values. The digit in subset 115" can thus represent an arbitrarily higher level abstraction—both of the abstractions generated in regions 705, 710 but also of the input data itself.

When different regions are primarily perturbed by a single class of input data, the processing in those regions can be tailored to the nature of the input data. For example, the depth of connection and the topology of network loops can be tailored to the input data. In recurrent neural networks that are modelled on biological systems, neuronal dynamics and synaptic plasticity can also be tailored to the input data. The tailoring, e.g., capture different time scales. For example, the processing in a region that is tailored to processing classes of input data that changes relatively rapidly (e.g., video or audio data) can be faster than the processing in a region that is tailored to processing classes of input data that changes relatively slowly or not at all.

Further, when different regions of a recurrent neural network are primarily perturbed by a single class of input data, it is easier for humans to attribute the representations that arise in a recurrent neural network to particular input data. The representations that arise in a particular region can be attributed to the class of input data that primarily perturbs that region. Once the representations that arise in a particular region are attributed, higher level and more complex abstractions that arise in response to the representations in a particular region can also be more easily understood.

Also, training can be targeted to portions of a recurrent neural network that are not primarily perturbed by a single class of input data, i.e., targeted to the portions of a recurrent neural network that fuse the processing results of regions that are primarily perturbed by a single class of input data. In effect, the regions that are primarily perturbed by a single class of input data will generate representations of the input data that are universal—not only for output from the recurrent neural network but also for further abstraction and other operations with the recurrent neural network.

Figure 8:
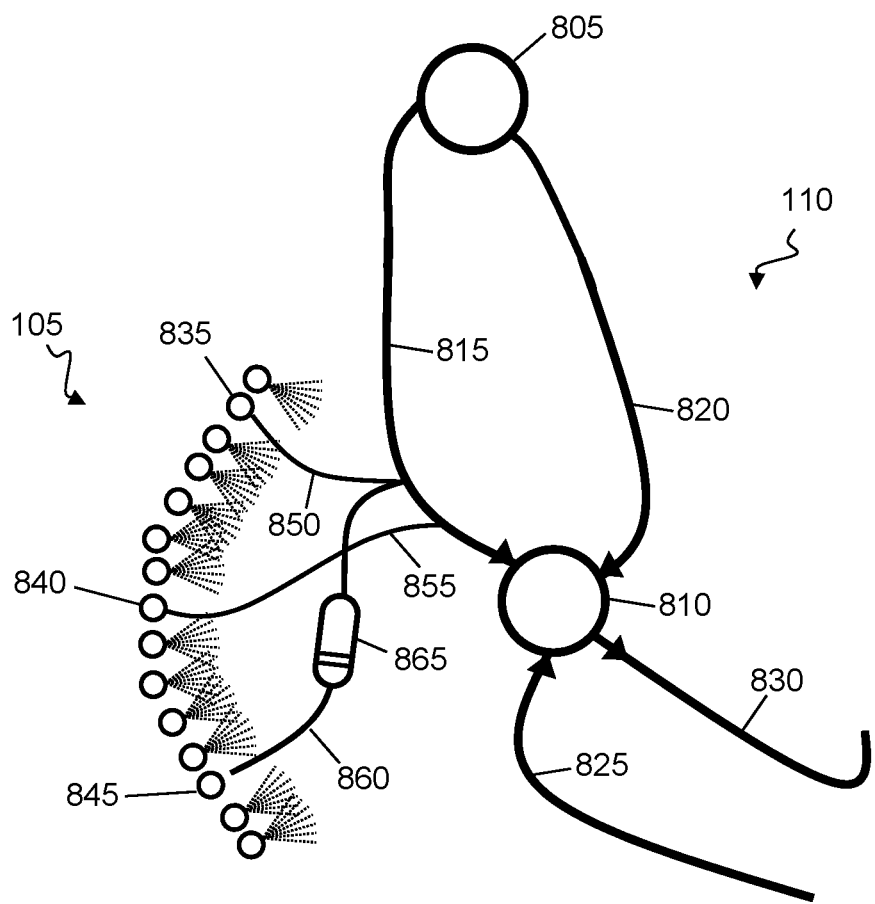

FIG. 8 is a schematic representation of another approach for inputting data 50 that originates from different sensors into neural network 110. The illustrated portion of neural network 110 includes nodes 805, 810 and links 815, 820, 825, 830. In the illustrated implementation, links 815, 820 are unidirectional links from node 805 to node 810. Links 815, 820 are also unidirectional links, but connect node 810 to other locations in neural network 110.

Inputs 105 include a first input 835, a second input 840, and a third input 845. In some implementations, first input 835 is dedicated to inputting data that originates from a first sensor, second input 840 is dedicated to inputting data that originates from a second sensor, and third input 845 is dedicated to inputting data that originates from a third sensor.

Inputs 835, 840, 845 can be nodes of an input layer. In the illustrated implementation, inputs 835, 840, 845 inject data into links of neural network 110, rather than nodes. In some implementations, inputs 835, 840, 845 can, e.g., scale some portion or all of the input data or perform other preliminary processing before data is conveyed to neural network 110.

In the illustrated implementation, input 835 injects data into a first position along link 815 over a link 850. Input 840 injects data into a second position along link 815 over a link 855. Input 845 injects data into the same first position along link 815 as input 835 over a link 860. However, link 860 includes a delay element 865. Delay element delays the arrival of data from input 845 at the first position along link 815. By delaying data from input 845, delay element 865 can help coordinate the arrival of data at the first position along link 815 in neural network 110.

As discussed above, such a delay may be useful in a variety of different circumstances. By delaying the arrival of data from input 845 at the first position along link 815, delay element 865 can help insure that the arrival of data from input 845 is properly synchronized with the arrival of data from input 845.

Figure 9:
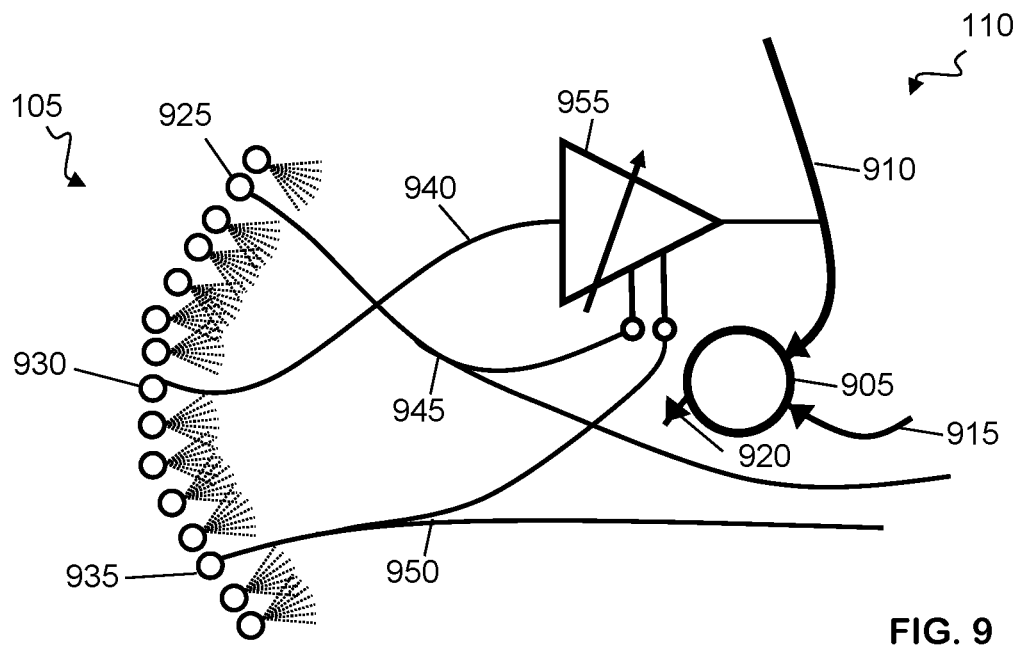

FIG. 9 is a schematic representation of another approach for inputting data 50 that originates from different sensors into neural network 110. The illustrated portion of neural network 110 includes a node 905 and links 910, 915, 920. In the illustrated implementation, links 910, 915 are unidirectional links directed toward node 905 and link 920 is a unidirectional link directed away from node 905.

Inputs 105 include a first input 925, a second input 930, and a third input 935. In some implementations, first input 925 is dedicated to inputting data that originates from a first sensor, second input 930 is dedicated to inputting data that originates from a second sensor, and third input 935 is dedicated to inputting data that originates from a third sensor.

Inputs 925, 930, 935 can be nodes of an input layer. In some implementations, inputs 925, 930, 935 can, e.g., scale some portion or all of the input data or perform other preliminary processing before data is conveyed to neural network 110.

In the illustrated implementation, input 930 injects data into a first position along link 910 over a link 940. Inputs 935, 940 inject data elsewhere into neural network 110 over a respective of links 945, 950. Further, the data conveyed over inputs 935, 940 can be used to scale the magnitude of the input over link 940. This is schematically represented in FIG. 9 by a variable amplifier 955, which scales input over link 940 based on the inputs over links 945, 950.

Please note that the illustration of variable amplifier 955 as a voltage controlled amplifier is schematic and for didactic purposes. For example, the data that inputs 935, 940 inject into neural network 110 over links 945, 950 need not be, e.g., a relatively slow changing voltage. Rather, for example, variable amplifier 955 can change the rate at which rate-coded data is input over link 940 based on the input on links 945, 950. As another example, variable amplifier 955 can change the timing of the input of phase coded data over link 940 based on the input on links 945, 950.

Regardless of how it is accomplished, the scaling of the data from input 930 based on data from inputs 925, 935 by variable amplifier 955 can help weigh the relative import of data that originates from one sensor based on data that originates from one or more other sensor(s).

Such a scaling may be useful in a variety of different circumstances. For example, data from input 930 may become more important if the sensors from which the data input over inputs 925, 935 originates are not present. As another example, data from input 930 may increase or decrease in relevance if the sensors from which the data input over inputs 925, 935 originates has certain values. As yet another example, the scaling of data from input 930 may reflect the training of neural network 110. For example, neural network 110 may include a collection of variable amplifiers such as variable amplifier 955 that each scales different inputs over different links. A directed training process can be used to tailor the scaling.

As yet another example, the scaling of data from input 930 may reflect external, context-dependent factors rather than internal, state-dependent factors. For example, the scaling may change based on, e.g., the time of day or other factor that is not otherwise reflected in the activity of neural network 110.

Figure 10:
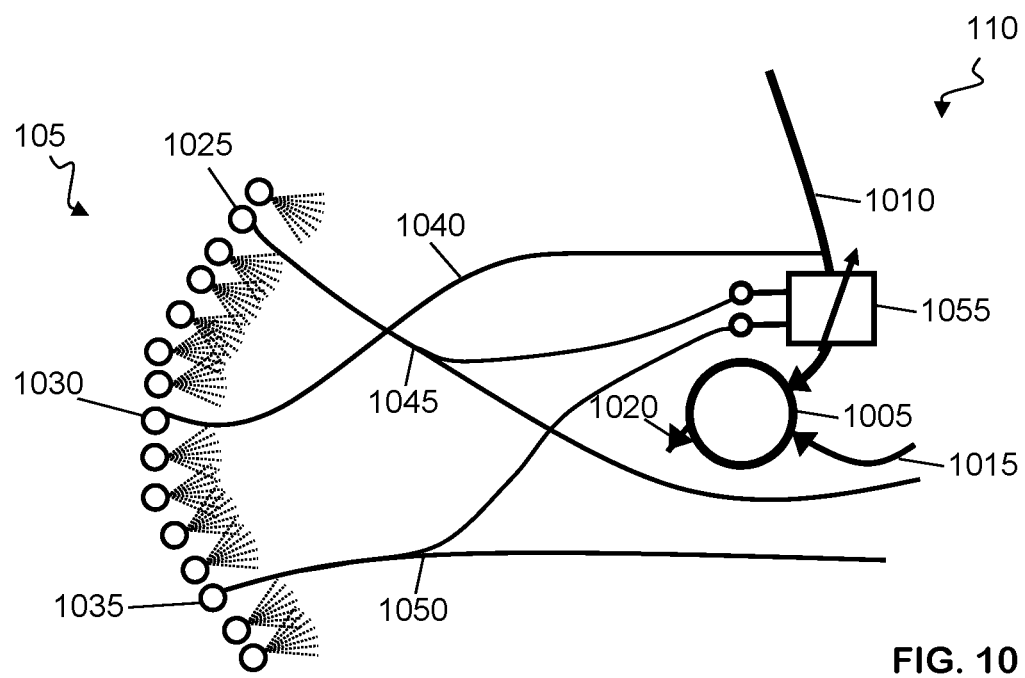

FIG. 10 is a schematic representation of another approach for inputting data 50 that originates from different sensors into a neural network 110. The illustrated portion of neural network 110 includes a node 1005 and links 1010, 1015, 1020. In the illustrated implementation, links 1010, 1015 are unidirectional links directed toward node 1005 and link 1020 is a unidirectional link directed away from node 1005.

Inputs 105 include a first input 1025, a second input 1030, and a third input 1035. In some implementations, first input 1025 is dedicated to inputting data that originates from a first sensor, second input 1030 is dedicated to inputting data that originates from a second sensor, and third input 1035 is dedicated to inputting data that originates from a third sensor.

Inputs 1025, 1030, 1035 can be nodes of an input layer. In some implementations, inputs 1025, 1030, 1035 can, e.g., scale some portion or all of the input data or perform other preliminary processing before data is conveyed to neural network 110.

In the illustrated implementation, input 1030 injects data into a first position along link 1010 over a link 1040. Inputs 1035, 1040 inject data elsewhere into neural network 110 over respective of link 1045, 1050. Further, the data conveyed over inputs 1035, 1040 can be used to change one or more parameters of link 1010. In the illustrated implementation, link 1010 includes a parameter setting element 1055 that is operable to vary one or more parameters of link 1010 based on the inputs over links 1045, 1050.

Examples of parameters that may be varied by parameter setting element 1055 include, e.g., the magnitude of a signal conveyed along link 1010, the timing of a signal conveyed along link 1010, the weight of a signal conveyed along link 1010, and even whether link 1010 can covey input 1030 to node 1005 at all. In implementations where neural network 110 is modelled on a biological system, one or more of morphological, chemical, and other characteristics of the biological system can be varied by parameter setting element 1055. Examples would include thresholds for activation of link 1010, the nature, number, and/or distribution of ion channels or receptors along link 1010, or any of a host of other parameters.

By varying one or more parameters of link 1010 based on the inputs over links 1045, 1050, parameter setting element 1055 can help weigh the relative import of data that originates from one sensor based on data that originates from one or more other sensor(s). As before, the scaling may reflect the training of neural network 110 and/or external, context-dependent factors.

Figure 11:
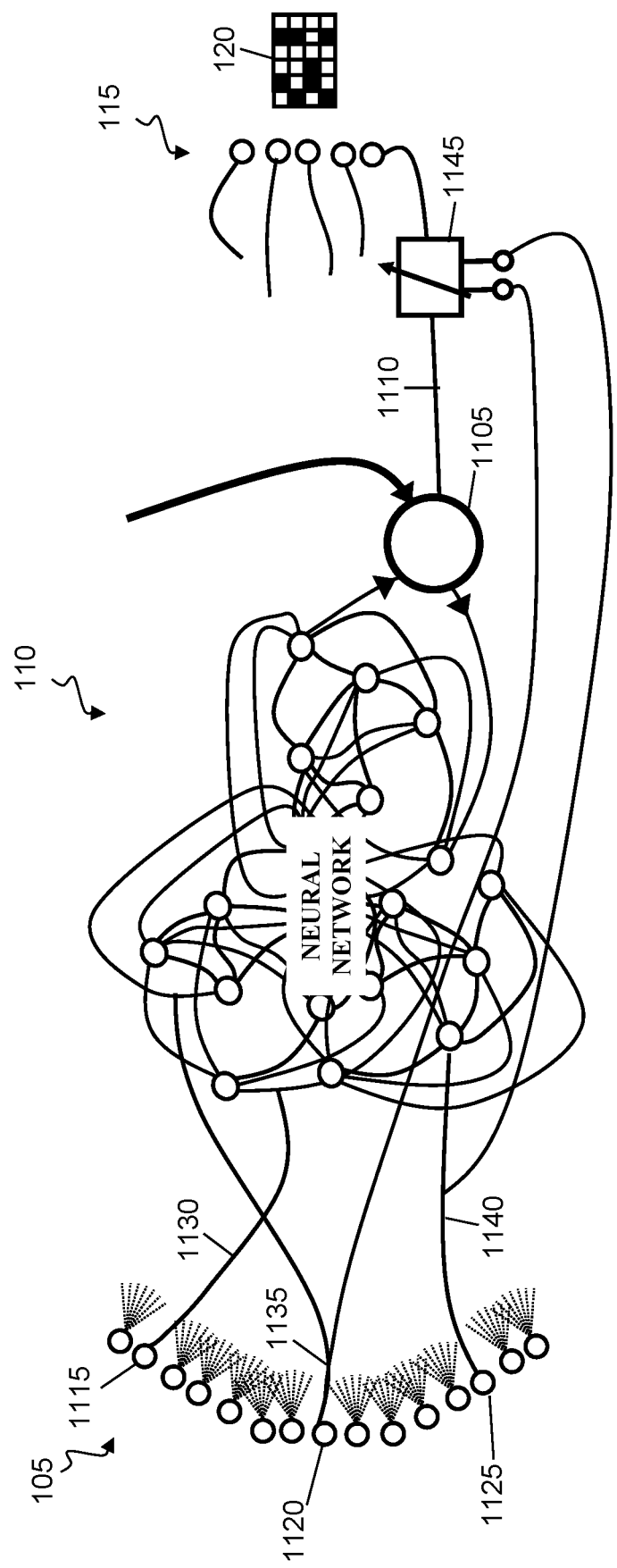
FIG. 11 is a schematic representation of an approach for outputting data from a neural network into which data that originates from different sensors is input.

FIG. 11 is a schematic representation of another approach for outputting data from neural network 110 into which data that originates from different sensors is input. The schematically represented neural network 110 includes a node 1105 that is read over a link 1110. Inputs 105 of neural network 110 also include a first input 1115, a second input 1120, and a third input 1125. In some implementations, first input 1115 is dedicated to inputting data that originates from a first sensor, second input 1120 is dedicated to inputting data that originates from a second sensor, and third input 1125 is dedicated to inputting data that originates from a third sensor.

In the illustrated implementation, inputs 1115, 1120, 1125 also inject data into neural network 110 over a respective link 1130, 1135, 1140. Further, the data conveyed over inputs 1120, 1125 can be used to change one or more parameters of the link 1110 over which node 1105 is read. In the illustrated implementation, link 1110 includes a parameter setting element 1145 that is operable to vary one or more parameters of link 1110 based on the inputs over links 1135, 1140.

Examples of parameters that may be varied by parameter setting element 1145 include, e.g., the value of a signal conveyed along link 1110 and the timing of a signal conveyed along link 1110. In implementations where neural network 110 is modelled on a biological system, one or more of morphological, chemical, and other characteristics of the biological system can be varied by parameter setting element 1145. Examples would include thresholds for activation of link 1110, the nature, number, and/or distribution of ion channels or receptors along link 1110, or any of a host of other parameters.

By varying one or more parameters of link 1110 based on the inputs over links 1135, 1140, parameter setting element 1145 can perform a variety of different actions. For example, parameter setting element 1145 may hold a value for a relatively longer time or until reset. A collection of such "holding" parameter setting elements could thus indicate whether certain patterns of activity arose during a relatively long time period. The time period can be, e.g., the duration of an input that changes over time, such as an audio or a video stream.

As another example, in implementations where the digits in collection 120 are multi-valued, parameter setting element 1145 can scale a value. The scaling may reflect, e.g., the training of neural network 110 and/or external, context-dependent factors. As yet another example, parameter setting element 1145 may act to prevent conveyance of a value to outputs 115, in effect, deleting the value. Once again, the deletion may reflect, e.g., the training of neural network 110 and/or external, context-dependent factors.

Figure 12:
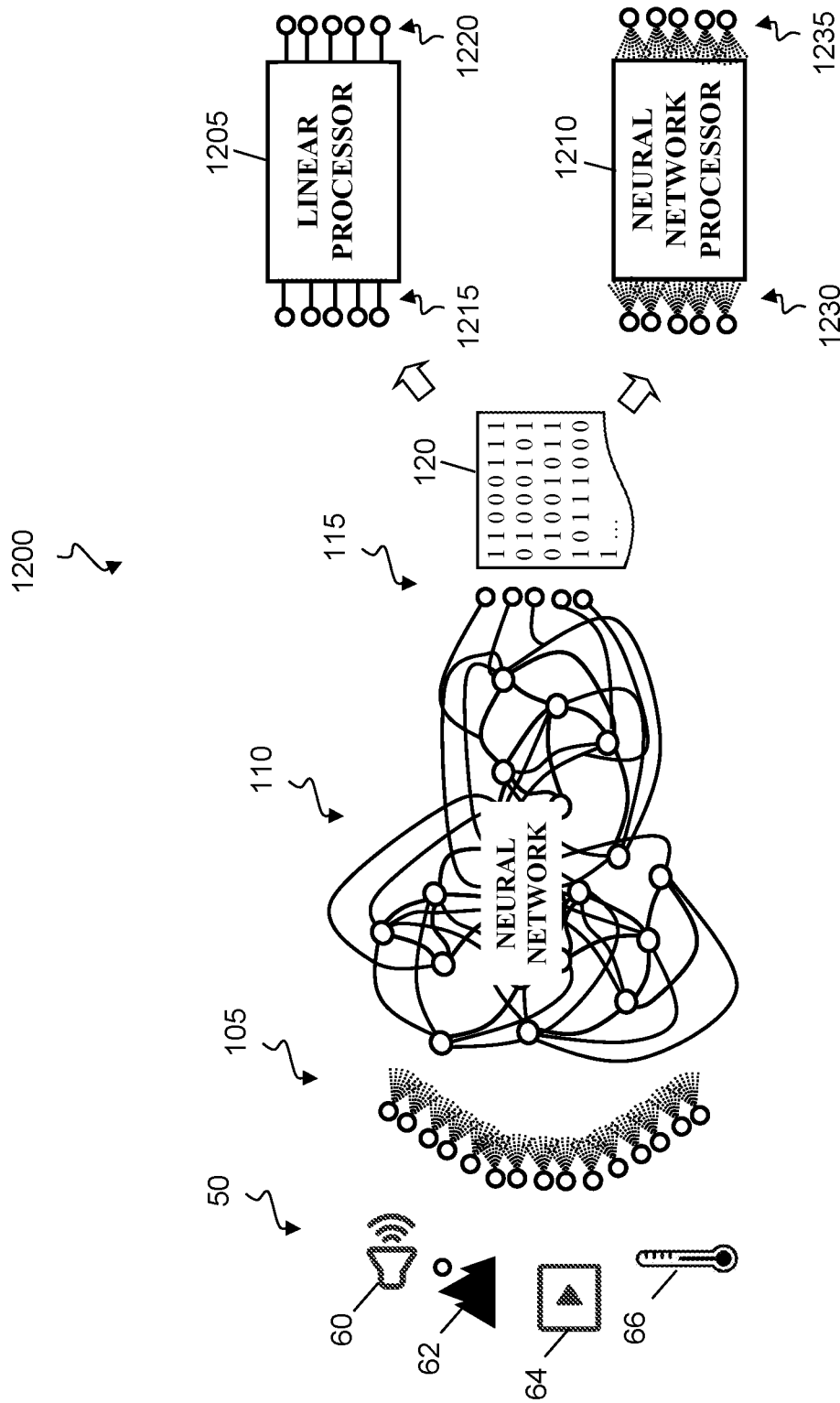
FIG. 12 is a schematic illustration of the use of a binary digit collection that represents the occurrence of topological structures in the activity in a neural network.

FIG. 12 is a schematic illustration of a use of a binary digit collection 120 that represents the occurrence of topological structures in the activity in a neural network. In particular, neural network 110 can be part of system 1200 that includes one or more processors 1205, 1210 that are dedicated to performing certain operations on binary digit collection 120.

In the illustrated implementation, processor 1205 is a linear processor that performs operations based on a linear combination of the characteristics of the binary digits in collection 120. For example, linear processor 1205 can be a device that classifies an object—namely, representations of the patterns of activity in a neural network. In other words, the representations of the patterns of activity is a feature vector that represents the characteristics of the input into neural network 1110 that are used by linear processor 1205 to classify data 50.

Linear processor 1205 includes an input 1215 and an output 1220. Input 1215 is coupled to receive representations of the patterns of activity in a neural network, namely, binary digit collection 120. Linear processor 1205 can receive binary digit collection 120 in a variety of ways. For example, the digits in collection 120 can be received as collection of discrete events or as a continuous stream over a real time or non-real time communication channel.

Output 1220 is coupled to output the processing result from linear processor 1205. In the illustrated implementation, output 1220 is schematically illustrated as a parallel port with multiple channels. This is not necessarily the case. For example, output 1220 can output the result over a serial port or a port with combined parallel and serial capabilities.

In some implementations, linear processor 1205 can be implemented on one or more computing devices with relatively limited computational performance. For example, linear processor 1205 can be implemented on a personal computer or a mobile computing device such as a smart phone or tablet.

In the illustrated implementation, processor 1210 is a neural network processor 1210. Neural network processor 1210 is a neural network device that performs operations on data—namely, representations of the patterns of activity in a neural network—based on a non-linear combination of the data's characteristics. For example, neural network processor 1210 can be a device that classifies an object—namely, representations of the patterns of activity in a neural network. In other words, the representations of the patterns of activity is a feature vector that represents the characteristics of the input into neural network 1110 that are used by neural network processor 1210 to classify data 50.

In the illustrated implementation, neural network processor 1210 is a feedforward network that includes an input layer 1230 and an output layer 1235. As with linear classifier 1205, neural network classifier 1210 can receive the binary digit collection 120 in a variety of ways. For example, the digits in collection 120 can be received as discrete events or as a continuous stream over a real time or non-real time communication channel.

In some implementations, neural network processor 1210 can perform inferences on one or more computing devices with relatively limited computational performance. For example, neural network processor 1210 can be implemented on a personal computer or a mobile computing device such as a smart phone or tablet, e.g., in a Neural Processing Unit of such a device.

In some implementations, neural network processor 1210 can be, e.g., a deep neural network such as a convolutional neural network that includes convolutional layers, pooling layers, and fully-connected layers. Convolutional layers can generate feature maps, e.g., using linear convolutional filters and/or nonlinear activation functions. Pooling layers reduce the number of parameters and control overfitting. The computations performed by the different layers in neural network processor 1210 can be defined in different ways in different implementations of neural network processor 1210.

Figure 13:
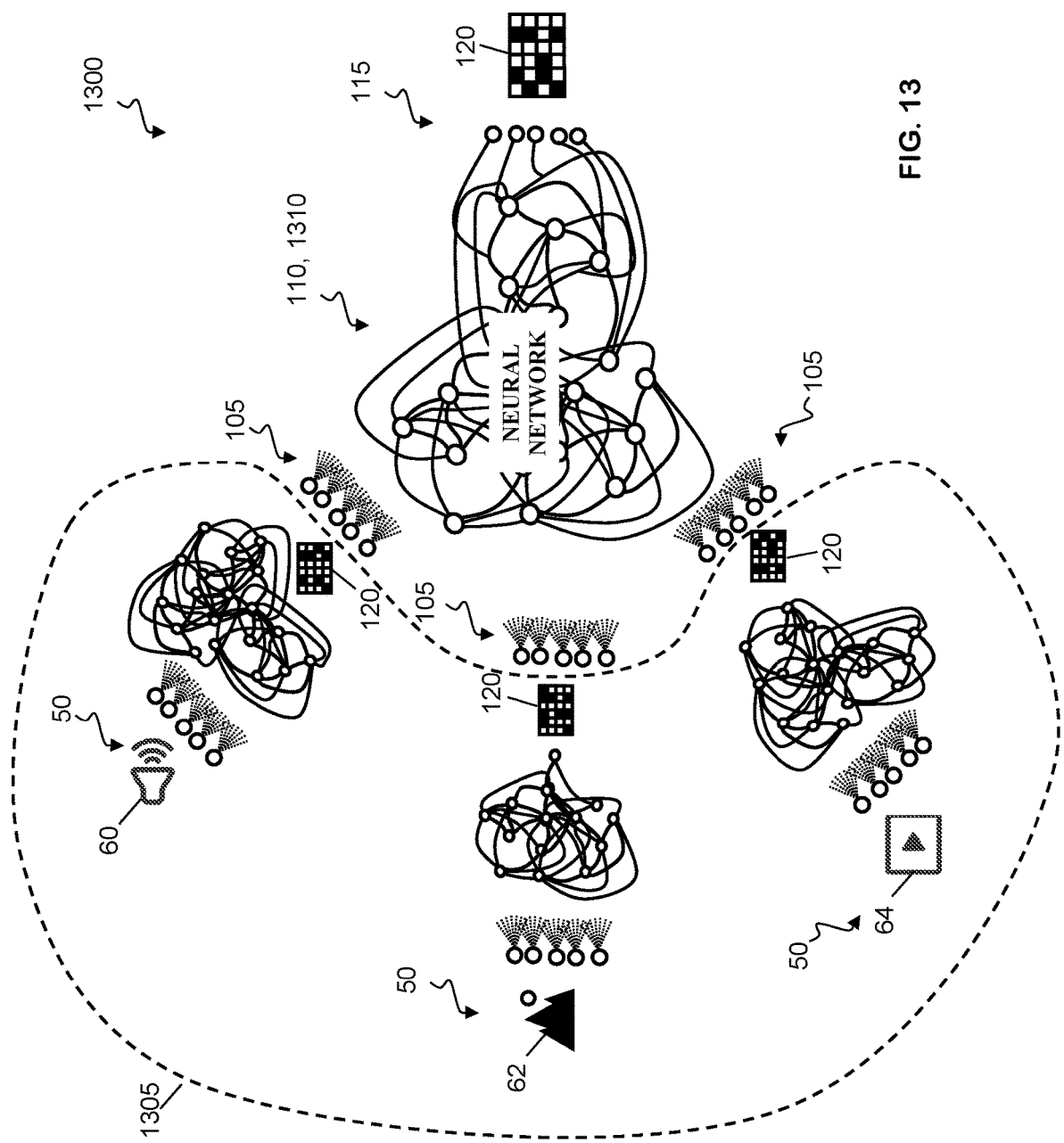
FIG. 13 is a schematic illustration of a hierarchical system of recurrent neural networks that abstracts data that originates from multiple, different sensors.

FIG. 13 is a schematic illustration of a hierarchical system 1300 of recurrent neural networks 110 that abstracts data 50 that originates from multiple, different sensors. Hierarchical system 1300 includes a first level 1305 of neural networks 110 and a second level 1310. Each neural network 110 in first level 1305 abstracts data 50 from a respective sensor and outputs a digit collection 120 that represents the occurrence of topological structures in the responsive activity. The neural network 110 in second level 1310 abstracts the digit collections 120 that are output from the neural networks 110 in first level 1305 and outputs a digit collection 120 that represents the occurrence of topological structures in the responsive activity. The digit collection 120 that is output from neural network 110 in second level 1310 can thus include correlates that fuse diverse input data 50 into a more complete "whole."

In the illustrated implementation, system 1300 is illustrated as having two levels. This is not necessarily the case. For example, a hierarchical system can include more levels. A hierarchical system of neural networks can be balanced or unbalanced, and ragged hierarchies are also possible.

Further, in the illustrated implementation, data 50 that is input into the neural network 110 in first level 1305 includes sound data 60, still image data 62, and video data 64. This is not necessarily the case and fewer and/or other types of input data are possible.

As an aside, each of the above-described processing actions (e.g., FIG. 5), approaches for inputting data (e.g., FIGS. 6-10), and approaches for outputting data (e.g., FIG. 11 can be used in conjunction with any of the neural networks at any hierarchical level.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations have been described. Nevertheless, it will be understood that various modifications may be made. Accordingly, other implementations are within the scope of the following claims.

What is claimed is:

1. A recurrent artificial neural network comprising:
a first region of the recurrent artificial neural network that is configured to receive and process data originating from a first sensor;
a second region of the recurrent artificial neural network that is configured to receive and process data originating from a second sensor, wherein the first sensor differs from the second sensor, wherein the first region is primarily perturbed by data originating from the first sensor and the second region is primarily perturbed by data originating from the second sensor even when both regions are perturbed at the same time; and
a third region of the recurrent artificial neural network that is configured to receive results of the processing by both the first region and by the second regions, wherein the third region is configured to output indications of the presence or absence of topological patterns of signal transmission activity within the recurrent artificial neural network, wherein the topological patterns are responsive to the results of the processing by the first region and by the second regions.

2. The recurrent artificial neural network of claim 1, wherein the third regions is configured to perform operations comprising:
identifying topological patterns of activity in the recurrent artificial neural network, wherein the topological patterns are responsive to input, into the recurrent artificial neural network, of first data originating from the first sensor and second data originating from the second sensor and each topological pattern abstracts a characteristic shared by the first data and the second data, wherein the first and second sensors sense different data; and
outputting a collection of digits, wherein each digit represents whether one of the topological patterns of activity has been identified in the artificial neural network.

3. The recurrent artificial neural of claim 2, wherein the operations further comprise defining a plurality of windows of time during which the activity of the artificial neural network is responsive to an input into the artificial neural network, wherein the topological patterns of activity are identified in each of the pluralities of windows of time.

4. The recurrent artificial neural of claim 2, wherein the first sensor produces a stream of output data and the second sensor produces slower changing or static output data.

5. The recurrent artificial neural of claim 4, wherein the slower changing or static output data is rate coded and the rate coded data is input into the recurrent artificial neural network at a same time as when the data that originates from the first transducer is input into the recurrent artificial neural network.

6. The recurrent artificial neural of claim 2, wherein the digits are multi-valued and represent a probability that the topological pattern of activity is present in the artificial neural network.

7. The recurrent artificial neural of claim 2, wherein:
the recurrent artificial neural further comprises a third region that is configured to receive third data originating from a third sensor, wherein the third sensor senses data that differs from the first and second data; and
the third region is configured to identify topological patterns of signal transmission activity within the recurrent artificial neural network that abstract a characteristic shared by the first data, the second data, and the third data.

8. The recurrent artificial neural network of claim 2, wherein the topological patterns of activity are clique patterns.

9. The recurrent artificial neural network of claim 8, wherein the clique patterns of activity enclose cavities.

10. The recurrent artificial neural network of claim 1, wherein each of the first region and the second region is an identifiably discrete collection of nodes and edges with relatively few node-to-node connections between the first region and the second region.

11. The recurrent artificial neural network of claim 1, wherein the first region is configured to output indications of the presence of topological patterns of signal transmission activity within the first region that are primarily responsive to the input of the data originating from the first sensor.

12. The recurrent artificial neural network of claim 1, wherein the topological patterns of signal transmission activity are clique patterns.

13. The recurrent artificial neural network of claim 12, wherein the clique patterns of signal transmission activity enclose cavities.

14. The recurrent artificial neural network of claim 12, wherein the clique patterns are directed clique patterns.

15. The recurrent artificial neural network of claim 1, wherein the first sensor produces a stream of output data and the second sensor produces slower changing or static output data.

16. The recurrent artificial neural network of claim 15, further comprising a rate coder coupled to rate code the slower changing or static output data and input the rate coded data into the second region at a same time as when the data that originates from the first sensor is input into the first region.

17. The recurrent artificial neural network of claim 1, further comprising means for scaling a magnitude of the data originating from the first sensor prior to receipt by the first region, wherein the scaling is based on the data originating from the second sensor.

18. The recurrent artificial neural network of claim 1, further comprising an input coupled to inject some of the data originating from the first sensor into a node or link of the recurrent neural network, wherein the input includes a delay or a scaling element, wherein a magnitude of the delay or of the scaling is based on the data originating from the second sensor.

* * * * *